(12) United States Patent
Dutta et al.

(10) Patent No.: US 11,494,562 B2
(45) Date of Patent: Nov. 8, 2022

(54) METHOD, APPARATUS AND COMPUTER PROGRAM PRODUCT FOR GENERATING TEXT STRINGS

(71) Applicant: Optum Technology, Inc., Eden Prairie, MN (US)

(72) Inventors: Rahul Dutta, Karnataka (IN); Kapil Mohan, Bangalore (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 204 days.

(21) Appl. No.: 15/929,645

(22) Filed: May 14, 2020

(65) Prior Publication Data
US 2021/0357590 A1   Nov. 18, 2021

(51) Int. Cl.
*G06F 40/30* (2020.01)
*G06F 40/253* (2020.01)
*G06F 40/284* (2020.01)
*G06N 3/08* (2006.01)

(52) U.S. Cl.
CPC ............ *G06F 40/30* (2020.01); *G06F 40/253* (2020.01); *G06F 40/284* (2020.01); *G06N 3/08* (2013.01)

(58) Field of Classification Search
CPC ...... G06F 40/30; G06F 40/253; G06F 40/284; G06F 40/216; G06F 40/56; G06F 40/44; G06N 3/08
See application file for complete search history.

(56) References Cited

U.S. PATENT DOCUMENTS

| | | |
|---|---|---|
| 2018/0012121 A1 | 1/2018 | Liu et al. |
| 2018/0329884 A1 | 11/2018 | Xiong et al. |
| 2019/0065462 A1 | 2/2019 | Salloum et al. |
| 2019/0065464 A1 | 2/2019 | Finley et al. |
| 2019/0197059 A1 | 6/2019 | Yu et al. |

(Continued)

FOREIGN PATENT DOCUMENTS

| | | | | |
|---|---|---|---|---|
| KR | 101851785 B1 * | 6/2018 | ............... | G06N 3/00 |
| WO | WO2017130089 A1 * | 1/2017 | ........... | G06F 40/247 |
| WO | 2019/023412 A1 | 1/2019 | | |

OTHER PUBLICATIONS

Donahue, David, et al., "Adversarial Text Generation Without Reinforcement Learning", Jan. 1, 2019, Version 2, 6 pages, https://arxiv.org/pdf/1810.06640.pdf, Aug. 12, 2020.

(Continued)

*Primary Examiner* — Abdelali Serrou
(74) *Attorney, Agent, or Firm* — Alston & Bird LLP

(57) ABSTRACT

Methods, apparatus, systems, computing devices, computing entities, and/or the like for programmatically generating text strings are provided. An example method may include receiving an input string; generating a first utterance set based at least in part on the input string and a randomness indicator via a generative machine learning model; generating at least one grammar context score for the first utterance set; generating at least one relevance context score for the first utterance set; adjusting the randomness indicator based at least in part on one or more of the at least one grammar context score, a grammar context threshold, the at least one relevance context score, and a relevance context threshold; and generating a second utterance set based at least in part on the input string and the adjusted randomness indicator.

20 Claims, 10 Drawing Sheets

(56) References Cited

U.S. PATENT DOCUMENTS

| | | | |
|---|---|---|---|
| 2020/0110836 A1* | 4/2020 | Kumbhar | G06F 40/51 |
| 2021/0056168 A1* | 2/2021 | Bull | G06F 40/284 |

OTHER PUBLICATIONS

Kaggle, "Dataset—Amazon Reviews for Sentiment Analysis", Nov. 13, 2019 to Jul. 10, 2020, Internet Archive, 2 pages, https://web.archive.org/web/20200710060118if_/https://www.kaggle.com/bittlingmayer/amazonreviews, Aug. 12, 2020.

Kim, Yoon, "Convolutional Neural Networks for Sentence Classification", Proceedings of the 2014 Conference on Empirical Methods in Natural Language Processing (EMNLP), pp. 1746-1751, Oct. 25-29, 2014, Doha, Qatar, https://www.aclweb.org/anthology/D14-1181.pdf, Aug. 12, 2020.

Park, N., et al., "Data Synthesis based on Generative Adversarial Networks", PVLDV, vol. 11, Issue 10, 2018, pp. 1071-1083, Vldb.org.

pubmed.gov, "https://pubmed.ncbi.nlm.nih.gov/", Sample dataset of medical terms for training Discriminator network, Jul. 15, 1997 to Aug. 13, 2020, Internet Archive, 1 page, https://web.archive.org/web/19970615071800/http://www.ncbi.nlm.nih.gov/PubMed/, Aug. 12, 2020.

Reddit, "reddit.com", Jul. 18, 2002 to Aug. 13, 2020, Internet Archive, 2 pages, http://web.archive.org/web/20060505014753/http://reddit.com/, Aug. 12, 2020.

stackexchange.com, "Machine Learning—Hard Voting Versus Soft Voting in Ensemble Based Methods—Cross Validated", Blog Question and Answer, Dec. 23, 2017-Jan. 8, 2018, 2 pages, https://stats.stackexchange.com/questions/320156/hard-voting-versus-soft-voting-in-ensemble-based-methods, Aug. 12, 2020.

Xu, Zhen, et al., "Neural Response Generation via GAN with an Approximate Embedding Layer," Proceedings of the 2017 Conference on Empirical Methods in Natural Language Processing, Sep. 7-11, 2017, pp. 617-626, Association for Computational Linguistics, Copenhagen, Denmark, https://www.aclweb.org/anthology/D17-1065.pdf, Aug. 12, 2020.

Yang, Zichao, et al., "Hierarchical Attention Networks for Document Classification", Proceedings of NAACL-HLT 2016, Jun. 12-17, 2016, pp. 1480-1489, San Diego, California, https://www.cs.cmu.edu/%7Ediyiy/docs/naacl16.pdf, Aug. 12, 2020.

Zhou, Peng, et al., "Text Classification Improved by Integrating Bidirectional LSTM with Two-dimensional Max Pooling", Proceedings of COLING 2016, the 26th International Conference on Computational Linguistics: Technical Papers, pp. 3485-3495, Dec. 11-17, 2016, Osaka, Japan, https://www.aclweb.org/anthology/C16-1329/, Aug. 12, 2020.

Chen, Jinyin et al. "Customizable Text Generation Via Conditional Text Generative Adversarial Network," Neurocomputing, vol. 416, Jun. 25, 2019, pp. 125-135, XP086306522, ISSN: 0925-2312, DOI: 10.1016/J.NEUCOM.2018.12.092.

Guan, Jiaqi et al. "A Method For Generating Synthetic Electronic Medical Record Text," IEEE/ACM Transactions on Computational Biology and Bioinformatics, vol. 18, No. 1, Jan./Feb. 2021, pp. 173-182, XP011835359, ISSN: 1545-5963, DOI: 10.1109/TCBB.2019.2948985.

International Searching Authority, International Search Report and Written Opinion for International Application No. PCT/US2021/031705, dated Aug. 23, 2021, (14 pages), European Patent Office, Rijswijk, Netherlands.

Iqbal, Touseef et al. "The Survey: Text Generation Models In Deep Learning," Journal of King Saud University—Computer and Information Sciences, Apr. 13, 2020, pp. 1-14, XP055831824, ISSN: 1319-1578, DOI: 10.1016/j.jksuci.2020.04.001.

Li, Zichao et al. "Paraphrase Generation With Deep Reinforcement Learning," arXiv: 1711.00279v3 [cs.CL], Aug. 23, 2018, (14 pages), zrXiv.org, Cornell University Library.

Lu, Sidi et al. "Neural Text Generation: Past, Present and Beyond," arXiv: 1803.071331v1 [cs.CL], Mar. 15, 2018, (7 pages), XP080865997, arXiv.org, Cornell University.

Yang, Yang et al. "FGGAN: Feature-Guiding Generative Adversarial Networks For Text Generation," IEEE Access, vol. 8, May 9, 2020, pp. 105217-105225, XP011792915, DOI: 10.1109/ACCESS.2020.2993928.

* cited by examiner

METHOD, APPARATUS AND COMPUTER PROGRAM PRODUCT FOR GENERATING TEXT STRINGS

TECHNOLOGICAL FIELD

Embodiments of the present disclosure relate generally to programmatically generating text strings. In particular, various embodiments of the present disclosure may generate utterances that may be implemented, for example, in the context of training conversational artificial intelligence programs and algorithms.

BACKGROUND

Applicant has identified many technical challenges, deficiencies and problems associated with generating text strings, which may be provided as part of an input for training conversational artificial intelligence programs and algorithms.

For example, a "chatbot" may refer to a computer program that may stimulate, process, and/or conduct a conversation (via auditory and/or textual means) with a human user, allowing the human user to interact with a digital device associated with the chatbot and/or to obtain relevant information. A chatbot may need to be trained so that it can generate accurate, relevant and grammatically correct answers to questions from the human user. For example, many chatbots may leverage supervised learning techniques to label entities and intents on text strings (i.e. utterances) that may be manually collected such that the chatbots may provide contextually relevant and grammatically correct answers for human users.

However, a chatbot may need to be trained on a large amount of utterances, and it may be resource and time consuming and heavily dependent on subject matter experts to generate these utterances. For example, in the healthcare context, when a chatbot is implemented to generate answers to questions related to healthcare benefits, the chatbot may need to provide complete, precise and unambiguous answers. Due to the huge scope of healthcare benefits, a few millions of utterances may need to be provided to train the chatbot. In some examples, it may take approximately four weeks to finish training a chatbot on thirty utterances, and therefore may take a few months or years to train the chatbot on healthcare benefit terms.

In addition, the potential population of utterances among different health benefits and healthcare service codes may not be equally distributed, partially due to the manual nature of utterance gathering process. In some examples, some service codes may have a large number of utterances compared to others. For example, the chiropractic service code may have 228 utterance variants, while the autism service code may have only 70 utterance variants, even though the latter may be the second most frequently used service code. As such, the imbalance of utterance population may cause imbalance in training chatbots, and may create a bottleneck for chatbots to provide precise answers.

BRIEF SUMMARY

In general, embodiments of the present disclosure provide methods, apparatus, systems, computing devices, computing entities, and/or the like.

In accordance with one aspect, an apparatus for programmatically generating utterances may be provided. The apparatus may comprise at least one processor and at least one non-transitory memory comprising a computer program code. The at least one non-transitory memory and the computer program code may be configured to, with the at least one processor, cause the apparatus to receive an input string; generate a first utterance set based at least in part on the input string and a randomness indicator via a generative machine learning model; calculate (e.g., generate, determine, and/or the like) at least one grammar context score for the first utterance set based at least in part on one or more grammar context rules; calculate (e.g., generate, determine, and/or the like) at least one relevance context score for the first utterance set via a discriminative machine learning model; adjust the randomness indicator based at least in part on one or more of the at least one grammar context score, a grammar context threshold, the at least one relevance context score, and a relevance context threshold; and generate a second utterance set based at least in part on the input string and the adjusted randomness indicator. In some examples, the first utterance set may comprise one or more utterances.

In some examples, when generating the first utterance set, the at least one non-transitory memory and the computer program code may be configured to, with the at least one processor, cause the apparatus to further: retrieve a historical utterance set from an utterance database; and generate the generative machine learning model based at least in part on the historical utterance set.

In some examples, when calculating (e.g., generating, determining, and/or the like) the at least one grammar context score, the at least one non-transitory memory and the computer program code may be configured to, with the at least one processor, cause the apparatus to further: generate a first token set based at least in part on the first utterance set, generate a first tag set based at least in part on the first token set, and calculate (e.g., generate, determine, and/or the like) a matching percentage between the first tag set and the one or more grammar context rules. In some examples, the first token set may comprise one or more tokens corresponding to one or more words in the first utterance set. In some examples, the first tag set may comprise one or more tags corresponding to the one or more tokens in the first token set. In some examples, each of the one or more tags is associated with the one or more grammar context rules. In some examples, the at least one grammar context score is associated with the matching percentage.

In some examples, when calculating (e.g., generating, determining, and/or the like) the at least one relevance context score, the at least one non-transitory memory and the computer program code may be configured to, with the at least one processor, cause the apparatus to further: generate a training dataset based at least in part on the input string; and generate the discriminative machine learning model based at least in part on the training dataset. In some examples, the discriminative machine learning model may comprise at least one text classification model.

In some examples, the at least one text classification model may comprise a Recurrent Neural Network (RNN), a Convolutional Neural Network (CNN), and a Hierarchical Attention Network (HAN).

In some examples, the at least one non-transitory memory and the computer program code may be configured to, with the at least one processor, cause the apparatus to further: generate at least one text classification indicator based at least in part on the first utterance set and the at least one text classification model; and calculate (e.g., generate, determine, and/or the like) the at least one relevance context score based at least in part on the at least one text classification indicator.

In some examples, when adjusting the randomness indicator, the at least one non-transitory memory and the computer program code may be configured to, with the at least one processor, cause the apparatus to further: determine whether the at least one grammar context score satisfies the grammar context threshold; and in response to determining that the at least one grammar context score does not satisfy the grammar context threshold, decrease a randomness value associated with the randomness indicator.

In some examples, when adjusting the randomness indicator, the at least one non-transitory memory and the computer program code may be configured to, with the at least one processor, cause the apparatus to further: determine whether the at least one relevance context score satisfies the relevance context threshold; and in response to determining that the at least one relevance context score does not satisfy the relevance context threshold, decrease a randomness value associated with the randomness indicator.

In some examples, the at least one non-transitory memory and the computer program code may be configured to, with the at least one processor, cause the apparatus to further: (a) generate an utterance set based at least in part on the input string and the randomness indicator; (b) calculate (e.g., generate, determine, and/or the like) a grammar context score for the utterance set based at least in part on the one or more grammar context rules; (c) determine whether the grammar context score satisfies the grammar context threshold; (d) in response to determining that the grammar context score does not satisfy the grammar context threshold, adjust the randomness indicator; and (e) repeat step (a) to step (d) until the grammar context score satisfies the grammar context threshold.

In some examples, the at least one non-transitory memory and the computer program code may be configured to, with the at least one processor, cause the apparatus to further: (a) subsequent to step (e), adjust the randomness indicator by a randomness buffer value; (b) calculate (e.g., generate, determine, and/or the like) a relevance context score for the first utterance set via the discriminative machine learning model; (c) determine whether the relevance context score satisfies the relevance context threshold; (d) in response to determining that the relevance context score does not satisfy the relevance context threshold, adjust the randomness indicator; and (e) repeat step (g) to step (i) until the relevance context score satisfies the relevance context threshold.

In accordance with one aspect, a computer-implemented method for programmatically generating utterances may be provided. The computer-implemented method may comprise receiving an input string; generating a first utterance set based at least in part on the input string and a randomness indicator via a generative machine learning model; calculating (e.g., generating, determining, and/or the like) at least one grammar context score for the first utterance set based at least in part on one or more grammar context rules; calculating (e.g., generating, determining, and/or the like) at least one relevance context score for the first utterance set via a discriminative machine learning model; adjusting the randomness indicator based at least in part on one or more of the at least one grammar context score, a grammar context threshold, the at least one relevance context score, and a relevance context threshold; and generating a second utterance set based at least in part on the input string and the adjusted randomness indicator. In some examples, the first utterance set may comprise one or more utterances.

In accordance with one aspect, a computer program product for programmatically generating utterances may be provided. The computer program product may comprise at least one non-transitory computer-readable storage medium having computer-readable program code portions stored therein. The computer-readable program code portions may comprise an executable portion configured to: receive an input string, generate a first utterance set based at least in part on the input string and a randomness indicator via a generative machine learning model; calculate (e.g., generate, determine, and/or the like) at least one grammar context score for the first utterance set based at least in part on one or more grammar context rules; calculate (e.g., generate, determine, and/or the like) at least one relevance context score for the first utterance set via a discriminative machine learning model; adjust the randomness indicator based at least in part on one or more of the at least one grammar context score, a grammar context threshold, the at least one relevance context score, and a relevance context threshold; and generate a second utterance set based at least in part on the input string and the adjusted randomness indicator. In some examples, the first utterance set may comprise one or more utterances.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 3:
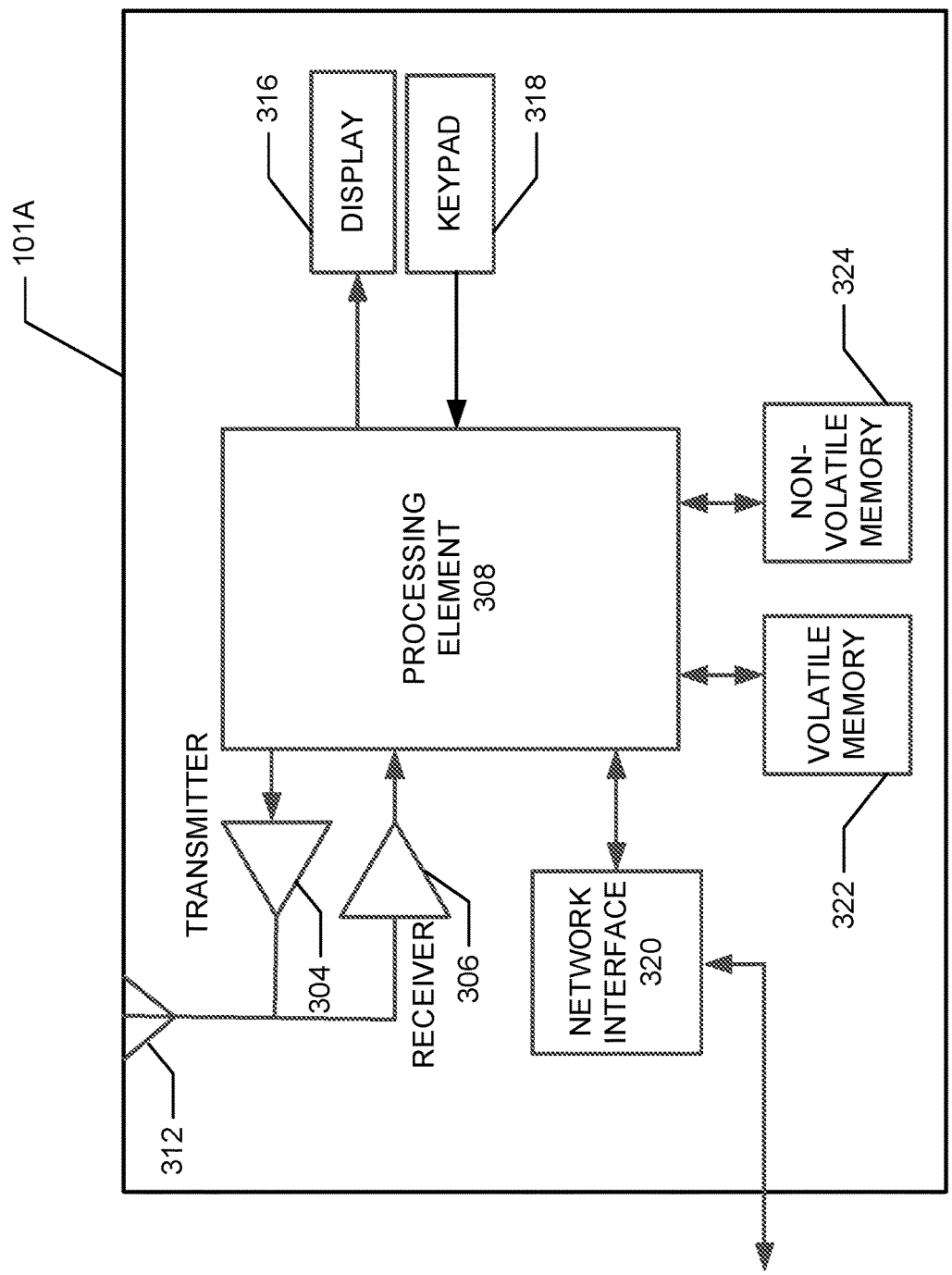

FIG. 3 is a schematic representation of an example user computing entity in accordance with various embodiments of the present disclosure; and FIGS. 4, 5, 6, 7, 8, 9A, and 9B provide example flowcharts illustrating example steps, processes, procedures, and/or operations associated with an example text string generating platform/system, in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

I. COMPUTER PROGRAM PRODUCTS, METHODS, AND COMPUTING ENTITIES

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
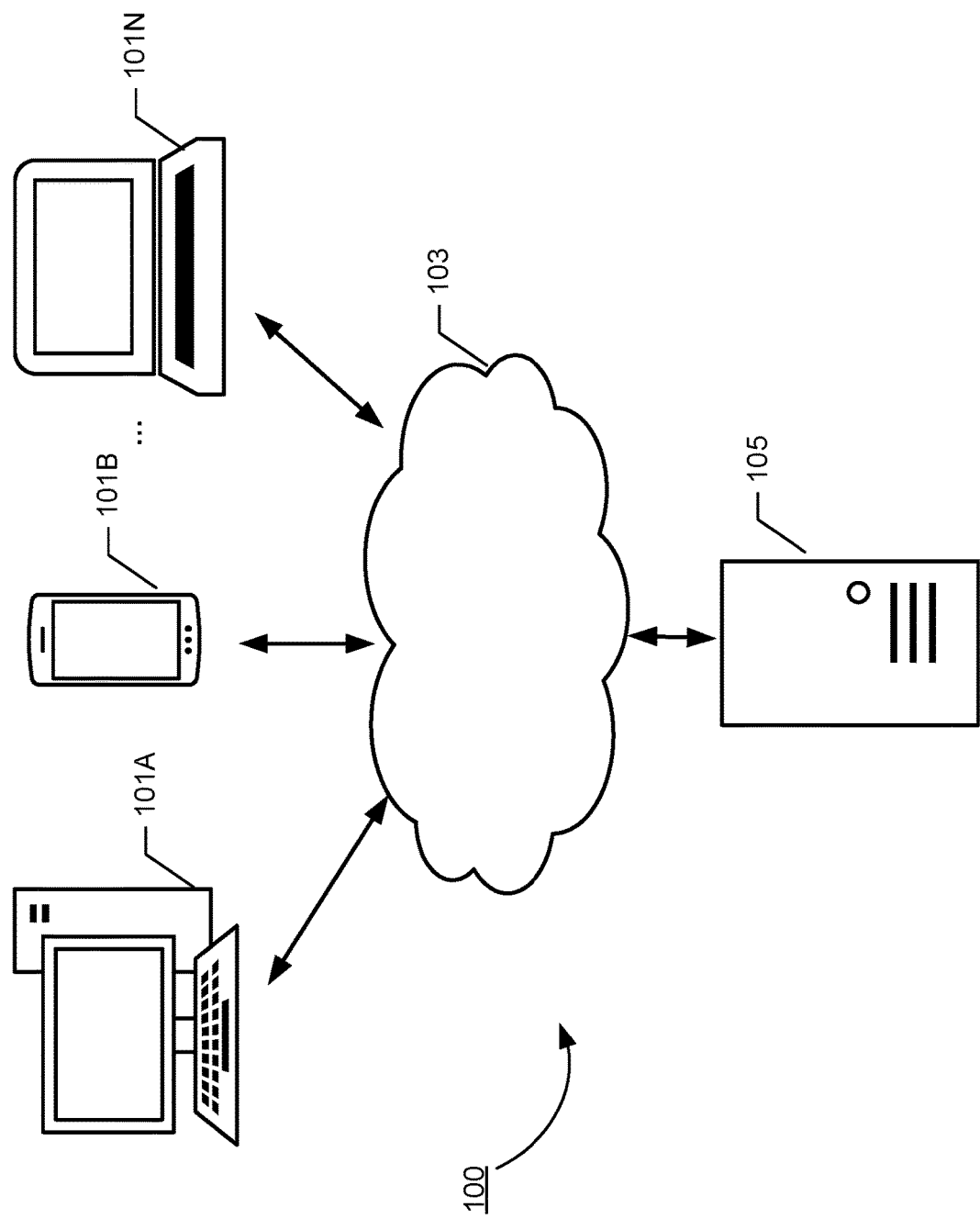
FIG. 1 is a diagram of an example text string generating platform/system that can be used in accordance with various embodiments of the present disclosure.

FIG. 1 provides an illustration of a text string generating platform/system 100 that can be used in conjunction with various embodiments of the present disclosure. As shown in FIG. 1, the text string generating platform/system 100 may comprise one or more text string computing entities 105, one or more user computing entities 101A, 101B, . . . 101N, and one or more networks 103. Each of the components of the text string generating platform/system 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Text String Computing Entity

Figure 2:
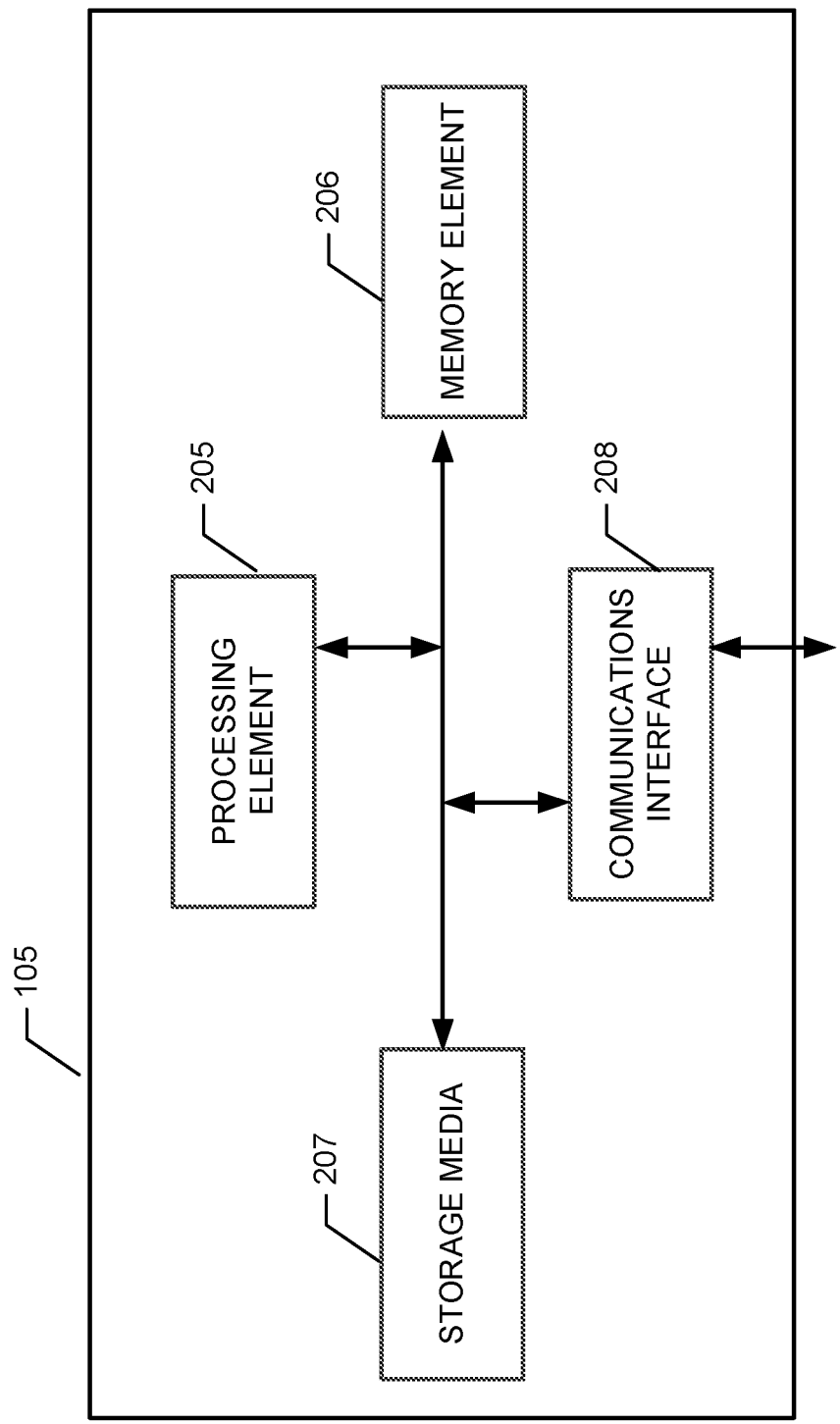
FIG. 2 is a schematic representation of an example text string computing entity in accordance with various embodiments of the present disclosure.

FIG. 2 provides a schematic of a text string computing entity 105 according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the text string computing entity 105 may also include one or more network and/or communications interfaces 208 for communicating with various computing entities, such as by communicating data, content, information, and/or similar terms used herein that can be transmitted, received, operated on, processed, displayed, stored, and/or the like. For instance, the text string computing entity 105 may communicate with other text string computing entities 105, one or more user computing entities 101A-101N, and/or the like.

As shown in FIG. 2, in one embodiment, the text string computing entity 105 may include or be in communication with one or more processing elements 205 (also referred to as processors, processing circuitry, and/or similar terms used herein interchangeably) that communicate with other elements within the text string computing entity 105 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, another circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the text string computing entity 105 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205 as shown in FIG. 2 and/or the processing element 308 as described in connection with FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the text string computing entity 105 with the assistance of the processing element 205 and operating system.

In one embodiment, the text string computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored. Further, the information/data required for the operation of the recovery prediction system may also be partially stored in the cloud data storage system and partially stored in a locally maintained data storage system. More specifically, storage media 207 may encompass one or more data stores configured to store information/data usable in certain embodiments.

As indicated, in one embodiment, the text string computing entity 105 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the text string computing entity 105 may communicate with computing entities or communication interfaces of other text string computing entities 105, user computing entities 101A-101N, and/or the like.

As indicated, in one embodiment, the text string computing entity 105 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the text string computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The text string computing entity 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the text string computing entity's components may be located remotely from other text string computing entity 105 components, such as in a distributed system. Furthermore, one or more of the components may be aggregated and additional components performing functions described herein may be included in the text string computing entity 105. Thus, the text string computing entity 105 can be adapted to accommodate a variety of needs and circumstances.

b. Exemplary User Computing Entity

FIG. 3 provides an illustrative schematic representative of one of the user computing entities 101A to 101N that can be used in conjunction with embodiments of the present disclosure. As will be recognized, the user computing entity may be operated by an agent and include components and features similar to those described in conjunction with the text string computing entity 105. Further, as shown in FIG. 3, the user computing entity may include additional components and features. For example, the user computing entity 101A can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a text string computing entity 105, another user computing entity 101A, and/or the like. In this regard, the user computing entity 101A may be capable of operating with one or more air interface standards, communication protocols, modulation types, and access types. More particularly, the user computing entity 101A may comprise a network interface 320, and may operate in accordance with any of a number of wireless communication standards and protocols. In a particular embodiment, the user computing entity 101A may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 101A can communicate with various other entities using Unstructured Supplementary Service data (USSD), Short Message Service (SMS), Multimedia Messaging Service (MMS), Dual-Tone Multi-Frequency Signaling (DTMF), Subscriber Identity Module Dialer (SIM dialer), and/or the like. The user computing entity 101A can also download changes, add-ons, and updates, for instance, to its firmware, software (e.g., including executable instructions, applications, program modules), and operating system.

According to one embodiment, the user computing entity 101A may include location determining aspects, devices, modules, functionalities, and/or similar words used herein interchangeably. For example, the user computing entity 101A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 101A may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 101A may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 101A to cause display or audible presentation of information/data and for user interaction therewith via one or more user input interfaces. The user output interface may be updated dynamically from communication with the text string computing entity 105. The user input interface can comprise any of a number of devices allowing the user computing entity 101A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 101A can collect information/data, user interaction/input, and/or the like.

The user computing entity 101A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entities 101A-101N.

c. Exemplary Networks

In one embodiment, the networks 103 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 103 may have any suitable communication range associated therewith and may include, for example, global networks (e.g., the Internet), MANs, WANs, LANs, or PANs. In addition, the networks 103 may include medium over which network traffic may be carried including, but is not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 103 may utilize a variety of networking protocols including, but not limited to, TCP/IP based networking protocols. In some embodiments, the protocol is a custom protocol of JSON objects sent via a Websocket channel. In some embodiments, the protocol is JSON over RPC, JSON over REST/HTTP, and/or the like.

III. EXEMPLARY OPERATION

Reference will now be made to FIGS. 4, 5, 6, 7, 8, 9A, and 9B, which provide flowcharts illustrating example steps, processes, procedures, and/or operations associated with a text string generating platform/system in accordance with various embodiments of the present disclosure.

While example embodiments of the present disclosure may be described in the context of training a chatbot to provide answers to questions related to healthcare benefits, as will be recognized, embodiments of the present disclosure are not limited to this context only.

a. Exemplary Utterance Generation

As described above, there is a need to generate utterances, for example, for training chatbots such that better performing machine learning model may be achieved.

To address these technical challenges, example embodiments of the present disclosure may implement two machine learning models that may include a generative machine learning model and a discriminative machine learning model. In some examples, the generative machine learning model may generate a large amount of utterances based at least in part on an input term (such as a term related to healthcare benefits). In some examples, the discriminative machine learning model may classify each utterance generated by the generative machine learning model as either relevant or irrelevant, and may demean the performance of the generative machine learning model. In some examples, a reinforcement learning algorithm may include one or more loop fissions to provide feedback data from the discriminative machine learning model to the generative machine learning model, such that the generative machine learning model may create more utterances that are contextually relevant and grammatically correct without manual intervention.

In the present disclosure, the term "utterance" may refer to a data structure that may represent a text string or a text sequence that may comprise one or more characters, words, phrases, sentences, and/or the like. In some examples, the text string or text sequence represented by the utterance may be associated with an input to a chatbot. As a non-limiting example, when the chatbot is implemented in the healthcare benefits context, an example text sting represented by an example utterance (i.e. an example user input to the chatbot) may be "I am looking for back pain coverage." It is noted that the scope of the present disclosure is not limited in the healthcare benefits context, and utterances and associated text strings may in other forms and/or associated with other contexts.

In the present disclosure, the term "set" may refer to a collection of one or more elements. For example, the term "utterance set" may refer to a collection of one or more utterances.

Figure 4:
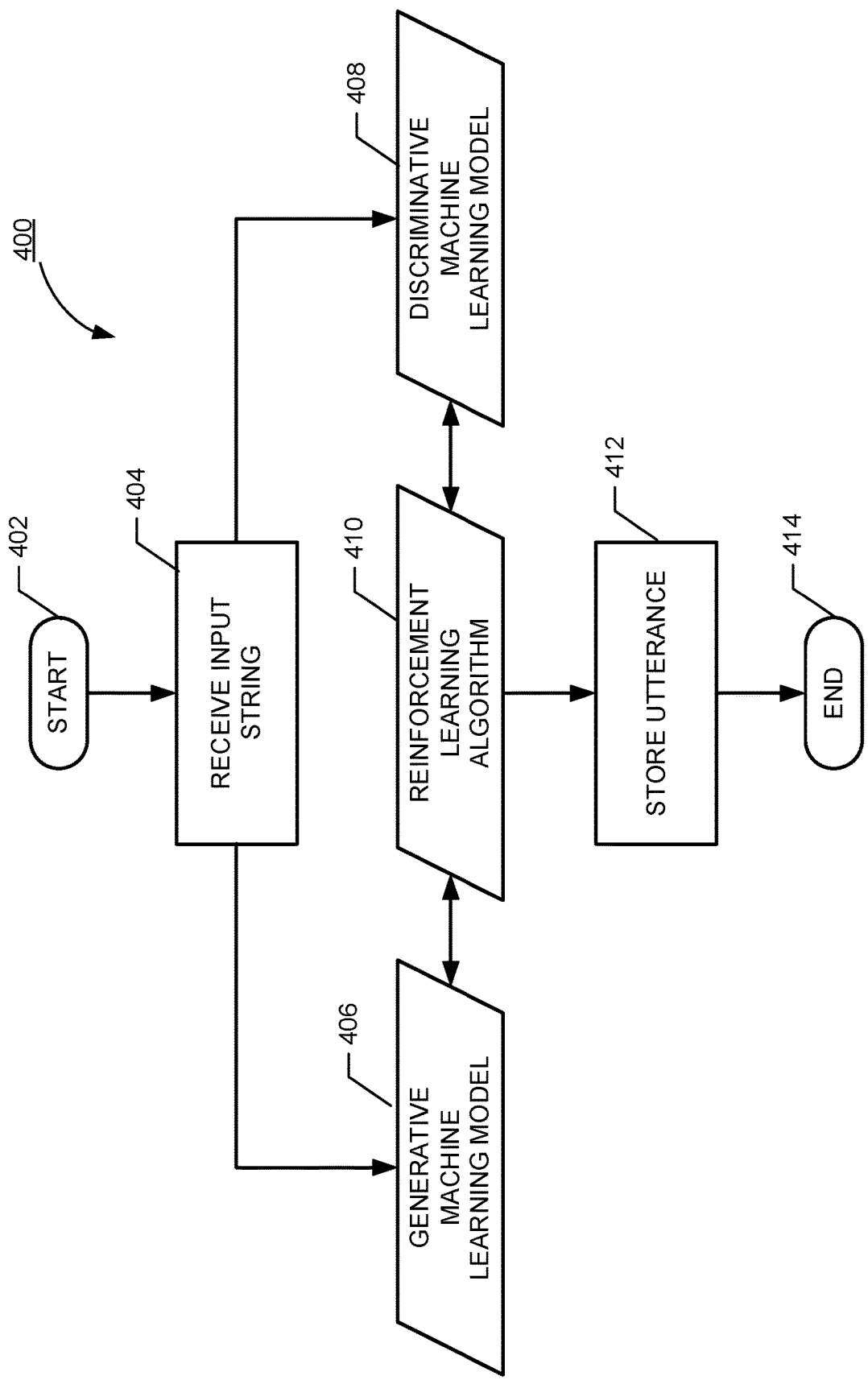

Referring now to FIG. 4, an example method 400 illustrates example utterance generation in accordance with embodiments of the present disclosure. The example method 400 may start at step/operation 402. At step/operation 404, a computing entity (such as the text string computing entity 105 described above in connection with FIG. 1 and FIG. 2) may receive an input string. In some examples, the input string may be received from a user computing entity (such as from one of the one or more user computing entities 101A, 101B, . . . 101N described above in connection with FIG. 1 and FIG. 3). For example, the input string may be received from the user computing entities 101A, 101B, . . . 101N via the one or more networks 103.

In some examples, the input string may be in the form of a string of text. For example, the input string may be related to a healthcare domain that a chatbot is expected to cover. Example input strings may include, but is not limited to, "acupuncture," "chiropractic," "autism," and/or the like. Additionally, or alternatively, the input string may be in other forms and/or related to other domains. In some examples, the input string may be provided to an example generative machine learning model and/or an example discriminative machine learning model, as illustrated in FIG. 4 and described herein. In some examples, the computing entity may generate one or more utterances based at least in part on the input string, and the one or more utterances may be associated with the healthcare domain indicated by the input string, details of which are described herein.

At step/operation 406, a computing entity (such as the text string computing entity 105 described above in connection with FIG. 1 and FIG. 2) may generate a first utterance set based at least in part on the input string. In some examples, the first utterance set may comprise one or more utterances. In some examples, the computing entity may implement a generative machine learning model to generate the first utterance set. In the present disclosure, the term "machine learning model" may refer to computer software programming instructions and/or algorithms that may programmatically generate one or more outputs and/or perform one or more tasks. The term "generative machine learning model" may refer to a machine learning model that may generate one or more outputs based at least in part on one or more inputs. Example generative machine learning model may include, but is not limited to, artificial neural networks such as bidirectional recurrent neural networks.

For example, the computing entity may implement a single layer bidirectional architecture for generating the first utterance set based at least in part on the input string. For example, the computing entity may generate a dictionary of words based at least in part on the input string and a dataset for training a bidirectional recurrent neural network. The computing entity may generate and train the bidirectional recurrent neural network using the dataset. The computing entity may provide the input string to the bidirectional recurrent neural network as input, which may generate the first utterance set as output. Example methods of generating and training an example generative machine learning model, as well as example methods of using an example generative machine learning model to generate the first utterance set, are described in connection with at least FIG. 5.

In some examples, in addition to the input string, a randomness indicator may also be provided to the generative machine learning model as an input for generating the first utterance set. In the present disclosure, the term "randomness indicator" may refer to a data object that may represent the randomness level of an utterance. In some examples, the randomness indicator may comprise a randomness value, which may be a numerical value between zero (0) and one (1). The higher the randomness value, the higher the random level that the utterance may be. In some examples, the randomness indicator may be adjusted based at least in part on the feedback from a discriminative machine learning model and/or through a reinforcement learning algorithm, details of which are described herein.

At step/operation 408, a computing entity (such as the text string computing entity 105 described above in connection with FIG. 1 and FIG. 2) may generate feedback data associated with the first utterance set based at least in part on, for example, a discriminative machine learning model.

In the present disclosure, the term "discriminative machine learning model" may refer to a machine learning model that may categorize and/or classify one or more inputs. For example, an example discriminative machine learning model may calculate (e.g., generate, determine, and/or the like) at least one relevance context score for the first utterance set. In the present disclosure, the term "relevance context score" may refer to a data object (which may be in the form of a mathematical value) that may indicate the likelihood that an utterance is contextually relevant to, for example, the input string. For example, the computing entity may generate the discriminative machine learning model using a model zoo approach, where a Recurrent Neural Network (RNN), a Convolutional Neural Network (CNN), and a Hierarchical Attention Network (HAN) may be trained using a training dataset. The computing entity may provide an utterance generated by the generative machine learning model as an input to the RNN, the CNN, and the HAN, and may perform soft voting to determine the final relevance context score associated with the utterance. Example details associated with generating the at least one grammar context score are described in connection with at least FIG. 6 and FIG. 7. In some examples, the feedback data may indicate the at least one relevance context score for the first utterance set.

In some examples, the feedback data may include at least one grammar context score for the first utterance set. In the present disclosure, the term "grammar context score" may refer to a data object (which may be in the form of a mathematical value) that may indicate the likelihood that an utterance is grammatically correct and/or appropriate. For example, the computing entity may calculate (e.g., generate, determine, and/or the like) the at least one grammar context score for the first utterance set based at least in part on one or more grammar context rules. Example details associated with generating the at least one grammar context score are described in connection with at least FIG. 8.

In some examples, the generative machine learning model described at step/operation 406 and the discriminative machine learning model described at step/operation 408 may form a generative adversarial network (GAN).

At step/operation 410, a computing entity (such as the text string computing entity 105 described above in connection with FIG. 1 and FIG. 2) may adjust the randomness indicator through a reinforcement learning algorithm.

In the present disclosure, the term "reinforcement learning algorithm" may refer to computer software programming instructions and/or algorithms that may, for example, improve correctness, accuracies, and/or relevance of outputs generated by a machine learning model. For example, an example reinforcement learning algorithm of the present disclosure may adjust the randomness indicator based at least in part on feedback data from the discriminative machine learning model, such that the generative machine learning model may generate utterances that are more grammatically correct and contextually relevant.

As described above, the randomness indicator may be part of input to the generative machine learning model for generating one or more utterances. Also, as described above, the discriminative machine learning model may generate at least one grammar context score and/or at least one relevance context score based at least in part on the one or more utterances generated by the generative machine learning model. In some examples, the computing entity may adjust the randomness indicator based at least in part on one or more of the at least one grammar context score, a grammar context threshold, the at least one relevance context score, and a relevance context threshold.

For example, the computing entity may determine whether the at least one grammar context score satisfies the grammar context threshold, and may adjust the randomness indicator accordingly. Additionally, or alternatively, the computing entity may determine whether the at least one relevance context score satisfies the relevance context threshold, and may adjust the randomness indicator accordingly.

Example details of the reinforcement learning algorithm and adjusting the randomness indicator are described in connection with at least FIG. 9A and FIG. 9B.

At step/operation 412, a computing entity (such as the text string computing entity 105 described above in connection with FIG. 1 and FIG. 2) may store one or more utterances.

For example, as described above, the reinforcement learning algorithm may adjust the randomness indicator based at least in part on feedback data from the discriminative machine learning model. Subsequently, the computing entity may implement the generative machine learning model to generate a second utterance set based at least in part on the input string and the adjusted randomness indicator, and may store the set utterance set in a data repository, such as a generated utterance base. In the present disclosure, the term "generated utterance base" may refer to a data storage device that may store information/data of accumulated corpus of generated utterances that may, for example, satisfy the threshold criteria described above (e.g. the grammar context threshold, the relevance context threshold). In some examples, utterances stored in the generated utterance base may be provided as at least part of the dataset for training a chatbot.

Referring back to FIG. 4, the example method 400 may end at step/operation 414. As will be recognized, the example method 400 may provide various technical advantages. For example, implementing a generative machine learning model for generating utterances may eliminate the dependency on subject matter expert to generate utterance variants associated with, for example, new healthcare benefits. Additionally, or alternatively, implementing a discriminative machine learning model and/or a reinforcement learning algorithm may improve the grammatical correctness and contextual relevance of the utterances generated by the generative machine learning model, and therefore may enable the right level of training for the chatbot to answer questions more precisely. As such, examples of the present disclosure may improve the effort-consuming and time-consuming process of generating utterances, and may reduce or eliminate bias in responses generated by chatbots due to lack of consistent utterances as training data.

b. Exemplary Generative Machine Learning Model

As described above, in some examples, a computing entity (such as the text string computing entity 105 described above in connection with FIG. 1 and FIG. 2) may generate a generative machine learning model, and may utilize the generative machine learning model to generate one or more utterances.

Figure 5:
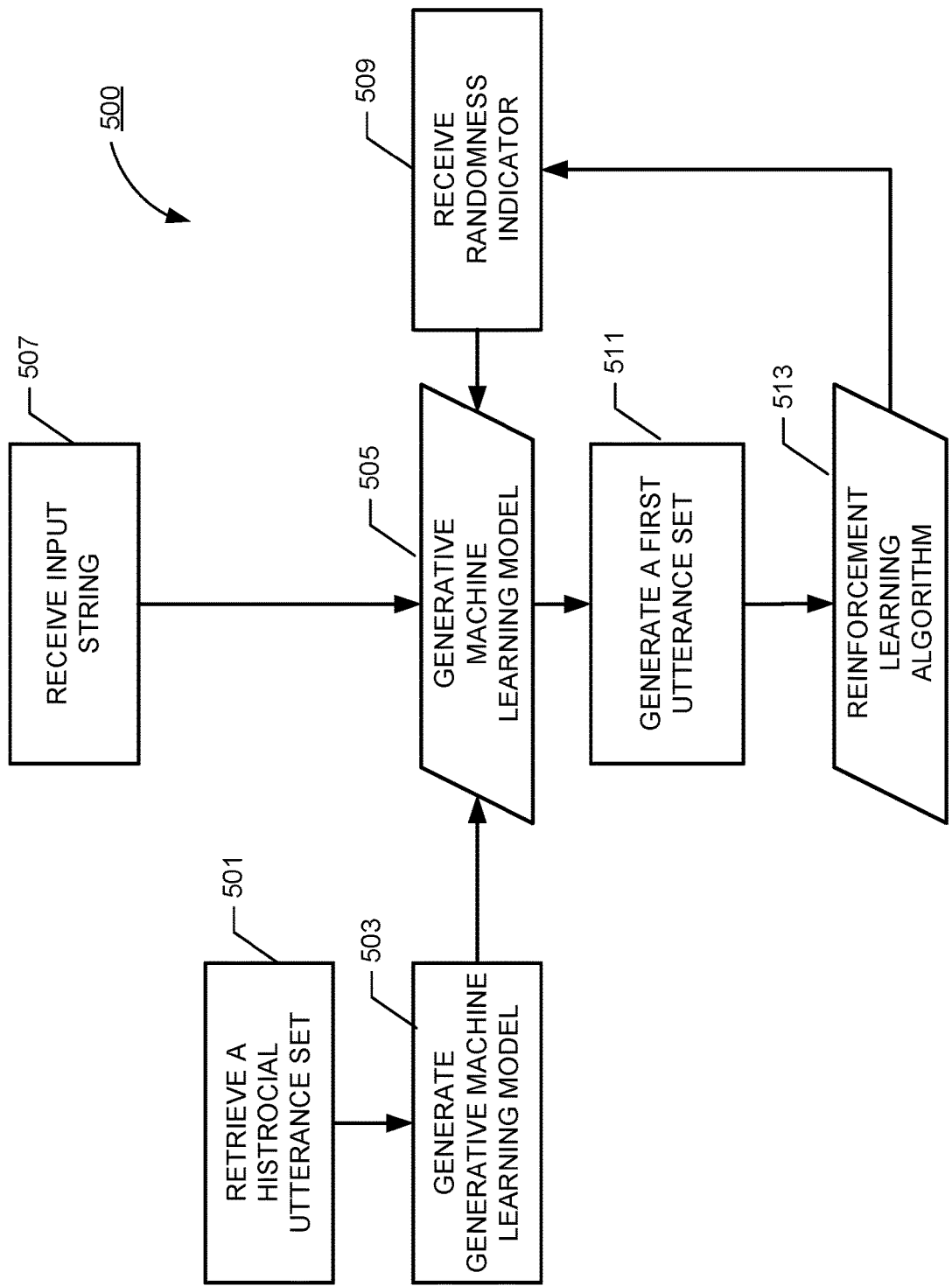

Referring now to FIG. 5, an example method 500 illustrates example operations of an example generative machine learning model in accordance with embodiments of the present disclosure. The example method 500 may start at step/operation 501. At step/operation 501, a computing entity (such as the text string computing entity 105 described above in connection with FIG. 1 and FIG. 2) may retrieve a historical utterance set from an utterance database. In some examples, the historical utterance set may comprise one or more utterances that one or more human users have provided to a chatbot. For example, a data repository (such as a data storage device) may store questions, requests, and/or the like that users of a chatbot have provided to the chatbot. As such, the computing entity may retrieve the historical utterance set to generate a generative machine learning model that may provide utterances for training the chatbot.

Additionally, or alternatively, the historical utterance set may comprise one or more utterances retrieved from other sources. For example, the computing entity may retrieve utterances from one or more open libraries of datasets, and may utilize utterances from these datasets as the historical utterance set for generating the generative machine learning model.

In some examples, subsequent to retrieving the historical utterance set, the computing entity may conduct preprocessing on the utterances in the historical utterance set. Example preprocessing may include, but is not limited to, removing one or more utterances associated with non-English language, removing punctuation characters, and/or the like.

At step/operation 503, a computing entity (such as the text string computing entity 105 described above in connection with FIG. 1 and FIG. 2) may generate and/or train a generative machine learning model based at least in part on the historical utterance set.

As described above, the computing entity may generate a bidirectional recurrent neural network as the generative machine learning model. An example of bidirectional recurrent neural network is a bidirectional long short-term memory ("bidirectional LSTM"). LSTM may refer to an artificial recurrent neural network architecture that may include feedback connections between nodes of the neural network. As such, an LSTM may process not only single input data point, but also input data sequence (such as a string of text). In a bidirectional LSTM, two (instead of one) input data sequences may be used to train the bidirectional LSTM, including the original input data sequence and a reversed copy of the input data sequence. As such, the bidirectional LSTM may provide more advanced and extensive learning on the input data sequence.

As an example, the computing entity may provide the following programming instructions for generating a generative machine learning model in the form of a bidirectional LSTM, including parameters for architectures and dimensions of the bidirectional LSTM:

```
model=Sequential( )
model.add(Bidirectional(LSTM(512, input_shape=(1000, len(chars)))))
model.add(Dense(len(chars), activation='softmax'))
model.compile(loss='categorical_crossentropy', optimizer=RMSprop(lr=0.01))
```

Continuing from the above example, the computing entity may provide the historical utterance set retrieved at step/operation 501 as input data sequence for training the bidirectional LSTM.

While the above example illustrates an example bidirectional LSTM as an example generative machine learning model, it is noted that the scope of the present disclosure is not limited to bidirectional LSTM. Additionally, or alternatively, an example generative machine learning model may comprise other machine learning models, deep learning models, and/or artificial intelligence algorithms.

At step/operation 505, a computing entity (such as the text string computing entity 105 described above in connection with FIG. 1 and FIG. 2) may store the generative machine learning model.

For example, the computing entity may store the generative machine learning model generated at step/operation 503 in a memory element (such as the memory element 206 described above in connection with FIG. 2). Subsequently, the computing entity may retrieve the generative machine learning model from the memory element to generate one or more utterances, as described below.

At step/operation 507, a computing entity (such as the text string computing entity 105 described above in connection with FIG. 1 and FIG. 2) may receive an input string for generating the utterances, similar to step/operation 404 described above in connection with FIG. 4.

At step/operation 509, a computing entity (such as the text string computing entity 105 described above in connection with FIG. 1 and FIG. 2) may receive a randomness indicator.

In some examples, the randomness indicator may be received from a reinforcement learning algorithm, such as the reinforcement learning algorithm as shown in FIG. 5. As described above in connection with FIG. 4, the computing entity may implement the reinforcement learning algorithm to adjust the randomness indicator based at least in part on, for example, feedback data from the discriminative machine learning model. Example details of the reinforcement learning algorithm and the discriminative machine learning model are described further herein.

At step/operation 511, a computing entity (such as the text string computing entity 105 described above in connection with FIG. 1 and FIG. 2) may generate the first utterance set based at least in part on the input string received at step/operation 507 and the randomness indicator received at step/operation 509.

In some examples, the computing entity may provide the input string and the randomness indicator as input to the generative machine learning model, and the generative machine learning model may generate the first utterance set based at least in part on the input string and the randomness indicator.

For example, as described above, the computing entity may implement a bidirectional LSTM as the generative machine learning model. The bidirectional LSTM may generate the utterance based at least in part on the input string (for example, acupuncture) and in accordance with the randomness indicator. As described above, the randomness indicator may indicate a randomness level of the utterances. For example, the randomness value associated with the randomness indicator may be initially set at 0.99, and the reinforcement learning algorithm and/or the discriminative machine learning model may further adjust and/or refine the randomness value, such that the generative machine learning model may produce grammatically correct and contextually relevant utterances.

At step/operation 513, a computing entity (such as the text string computing entity 105 described above in connection with FIG. 1 and FIG. 2) may provide the first utterance set generated at step/operation 511 to the reinforcement learning algorithm.

In some examples, based at least in part on the first utterance set and feedback data associated with the first utterance (generated by the discriminative machine learning model), the computing entity may implement the reinforcement learning algorithm to adjust the randomness indicator, example details of which are described herein.

c. Exemplary Discriminative Machine Learning Model

Figure 6:
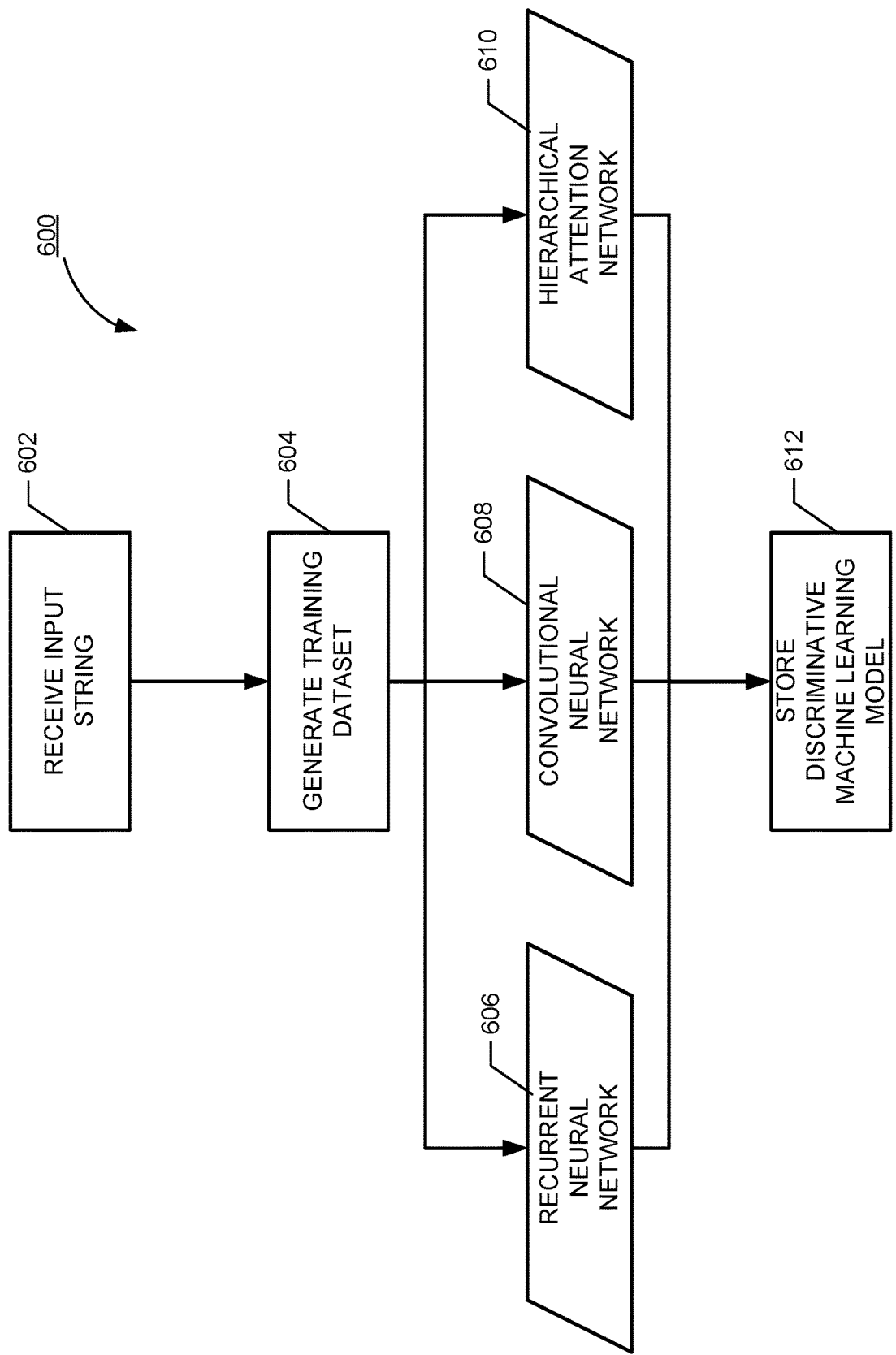
Figure 7:
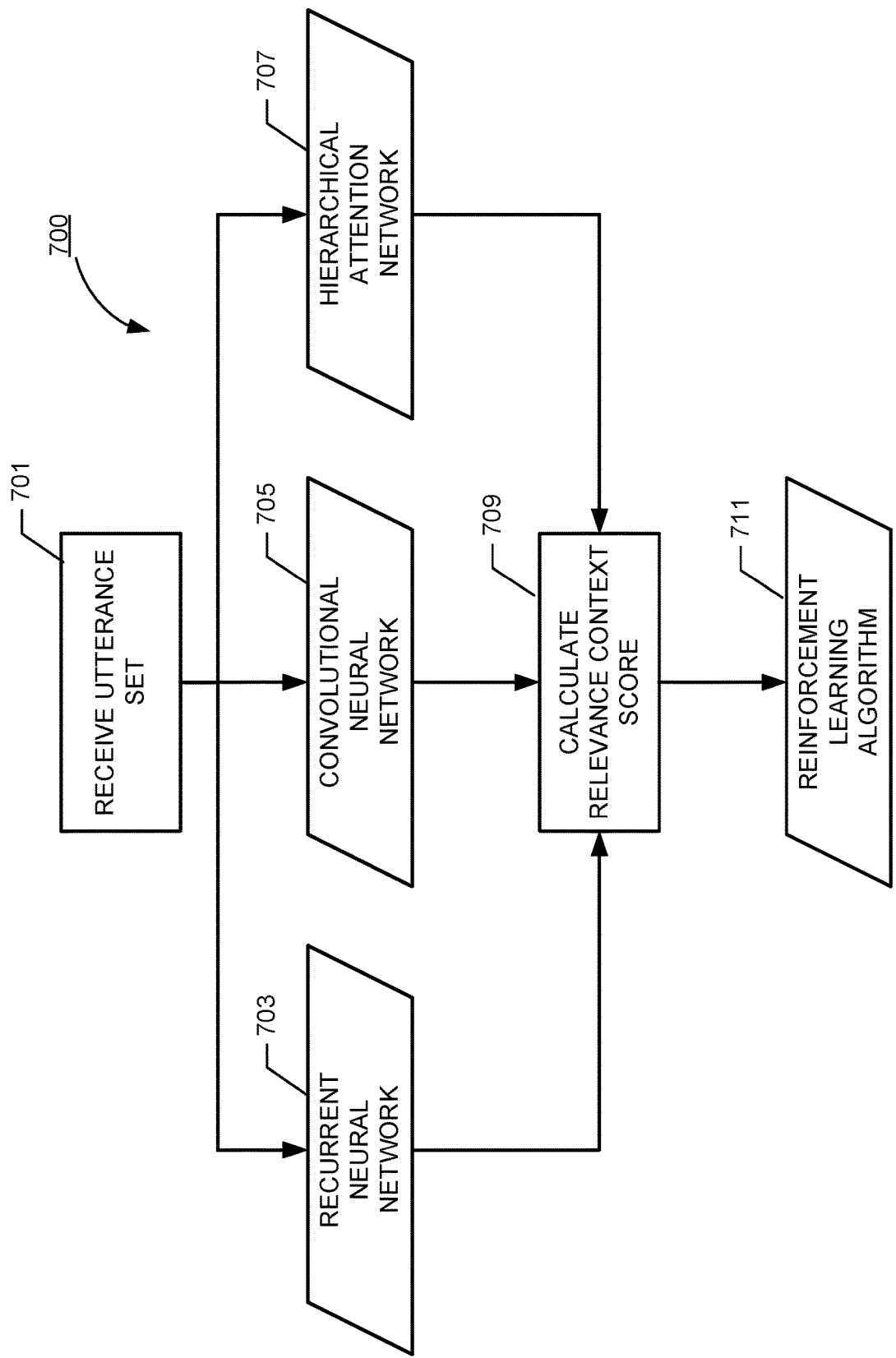
Figure 8:
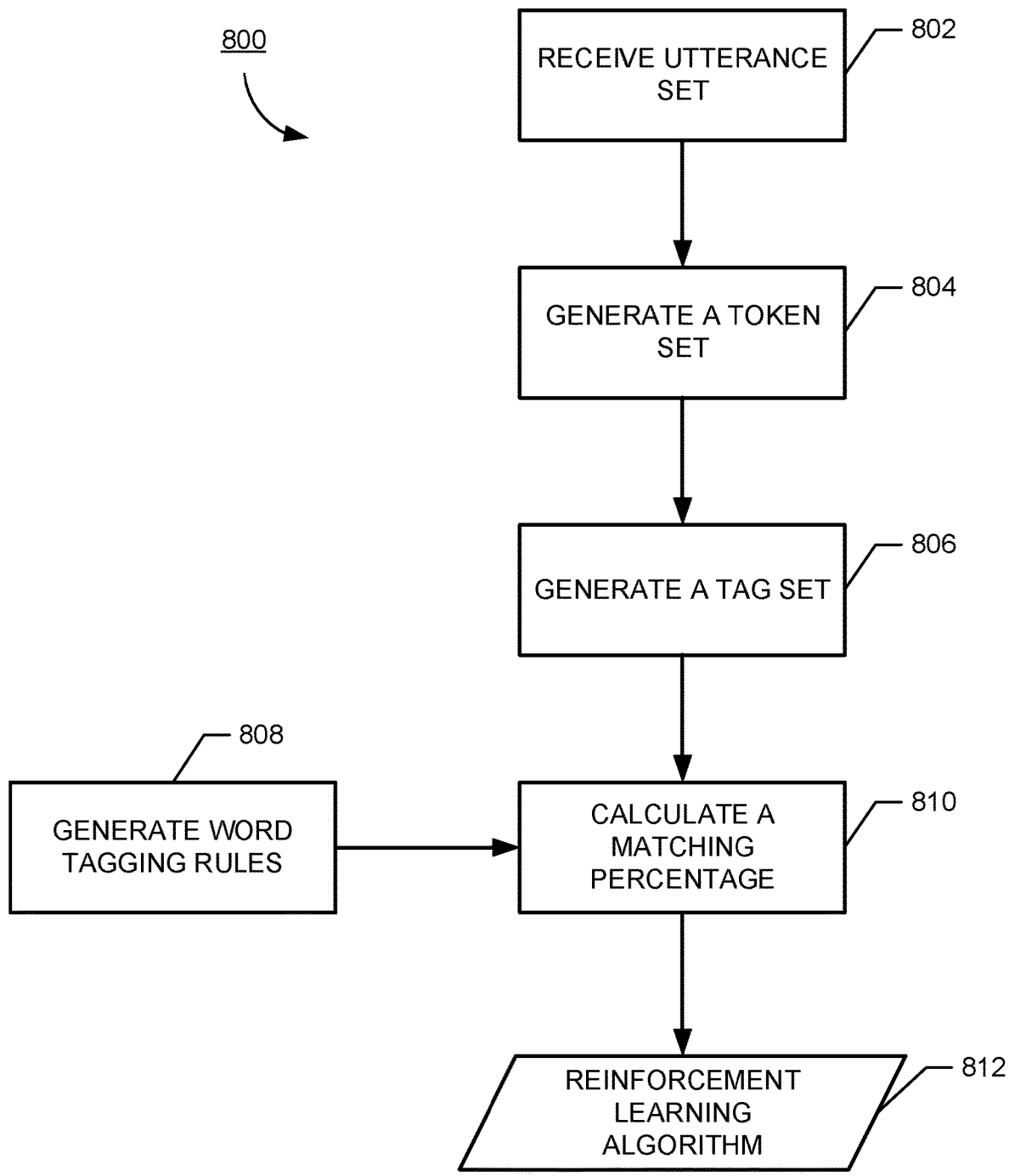

As described above, in some examples, a computing entity (such as the text string computing entity 105 described above in connection with FIG. 1 and FIG. 2) may generate a discriminative machine learning model, and may utilize the discriminative machine learning model to generate feedback data associated with one or more utterances generated by a generative machine learning model. FIG. 6, FIG. 7, and FIG. 8 illustrate example operations associated with an example generative machine learning model and/or generating feedback data.

Referring now to FIG. 6, an example method 600 illustrates example operations of generating a discriminative machine learning model in accordance with embodiments of the present disclosure. The method 600 may start at step/operation 602. At step/operation 602, a computing entity (such as the text string computing entity 105 described above in connection with FIG. 1 and FIG. 2) may receive an input string, similar to step/operation 404 described above in connection with FIG. 4.

At step/operation 604, a computing entity (such as the text string computing entity 105 described above in connection with FIG. 1 and FIG. 2) may generate a training dataset based at least in part on the input string. In some examples, the computing entity may generate the training dataset based at least in part on a historical utterance set that may comprise one or more utterances that one or more human users have provided to a chatbot, similar to those described above in connection with FIG. 5. For example, a data repository (such as a data storage device) may store questions, requests, and/or the like that users of a chatbot have provided to the chatbot. Additionally, or alternatively, the computing entity may generate training dataset from other sources. For example, the computing entity may retrieve utterances from one or more open libraries of datasets, and may utilize utterances from these datasets as the training dataset for generating the generative machine learning model. As an example, the input string received at step/operation 602 may comprise the term "acupuncture." The processing circuitry may crawl and/or retrieve data from publicly available data sources based at least in part on the term "acupuncture," and may generate a training dataset accordingly.

In some examples, when generating the training dataset, the computing entity may conduct preprocessing on the data retrieved from historical utterance set and/or other sources. For example, the computing entity may remove data that may indicate a user identifier associated with the utterance (for example, user identifiers associated with "posted by," "commented by," and/or the like). In some examples, the computing entity may conduct data formatting on the retrieved data to generate a training dataset. For example, the following is an example formatting message substantially in the form of JavaScript Object Notation (JSON):
{'patterns': ['I am looking for acupuncture coverage', 'is he covered for acupuncture'], 'tag':'Acupuncture'}

In some examples, the computing entity may generate the discriminative machine learning model based at least in part on the training dataset, and the discriminative machine learning model may comprise at least one text classification model, as described herein.

For example, at step/operation 606, a computing entity (such as the text string computing entity 105 described above in connection with FIG. 1 and FIG. 2) may generate a Recurrent Neural Network (RNN). In the present disclosure, RNN may refer to an artificial neural network that may comprise one or more layers of nodes. In some examples, connections between nodes in an example RNN may form a directed graph along a sequence. In some examples, the computing entity may train the RNN using the training dataset generated at step/operation 604.

At step/operation 608, a computing entity (such as the text string computing entity 105 described above in connection with FIG. 1 and FIG. 2) may generate a Convolutional Neural Network (CNN). In the present disclosure, CNN may refer to an artificial neural network that may comprise one or more layers of nodes. In some examples, connections between nodes in an example CNN may not form a cycle. In some examples, the computing entity may train the CNN using the training dataset generated at step/operation 604.

At step/operation 610, a computing entity (such as the text string computing entity 105 described above in connection with FIG. 1 and FIG. 2) may generate a Hierarchical Attention Network (HAN). In the present disclosure, HAN may refer to a text classification model that may analyze the hierarchical structure of a document and provide an attention mechanism to locate the most important words and sentences in the document while taking the context of the document into consideration. In some examples, the computing entity may train the HAN using the training dataset generated at step/operation 604.

While the above description illustrates example text classification models such as RNN, CNN, and HAN, it is noted that the scope of the present disclosure is not limited to these text classification models. In some examples, other text classification models may be implemented by the computing entity in addition to or in alterative of any of these text classification models. In some examples, less than three or more than three text classification models may be implemented.

Additionally, or alternatively, the discriminative machine learning model may be trained based at least in part on data in addition to or in alternative of the training dataset generated at step/operation 604. For example, the discriminative machine learning model may be trained with input from subject matter experts indicating the contextual relevance level of one or more utterances.

At step/operation 612, a computing entity (such as the text string computing entity 105 described above in connection with FIG. 1 and FIG. 2) may store the discriminative machine learning model. In some examples, the stored discriminative machine learning model may include a RNN, a CNN, and a HAN that are generated at step/operation 606, step/operation 608, and step/operation 608, respectively. For example, the computing entity may store the discriminative machine learning model in a memory element (such as the memory element 206 described above in connection with FIG. 2). Subsequently, the computing entity may retrieve the discriminative machine learning model from the memory to generate one or more relevance context scores, as described below.

Referring now to FIG. 7, an example method 700 illustrates example operations of utilizing a discriminative machine learning model to calculate (e.g., generate, determine, and/or the like) relevance context score in accordance with embodiments of the present disclosure. The method 700 may start at step/operation 701. At step/operation 701, a computing entity (such as the text string computing entity 105 described above in connection with FIG. 1 and FIG. 2) may receive an utterance set. For example, as described above in connection with at least FIG. 5, the computing entity may implement a generative machine learning model to generate an utterance set, and may provide the generated utterance set to a reinforcement learning algorithm. In some examples, the reinforcement learning algorithm may provide the utterance set to an example discriminative machine learning model.

As described above in connection with FIG. 6, an example discriminative machine learning model in accordance with the present discourse may include a RNN, a CNN, and/or a HAN. In such an example, the computing entity may provide the utterance set to each of the RNN, the CNN, and/or the HAN, and each of the RNN, the CNN, and/or the HAN may generate a corresponding text classification indicator.

For example, at step/operation 703, a computing entity (such as the text string computing entity 105 described above in connection with FIG. 1 and FIG. 2) may generate a text classification indicator for the utterance set based at least in part on the RNN. In some examples, the text classification indicator may include a numeric value indicating the likelihood that an utterance is contextually relevant to the input string as determined by the RNN.

At step/operation 705, a computing entity (such as the text string computing entity 105 described above in connection with FIG. 1 and FIG. 2) may generate a text classification indicator for the utterance set based at least in part on the CNN. In some examples, the text classification indicator may include a numeric value indicating the likelihood that an utterance is contextually relevant to the input string as determined by the CNN.

At step/operation 707, a computing entity (such as the text string computing entity 105 described above in connection with FIG. 1 and FIG. 2) may generate a text classification indicator for the utterance set based at least in part on the HAN. In some examples, the text classification indicator may include a numeric value indicating the likelihood that an utterance is contextually relevant to the input string as determined by the HAN.

At step/operation 709, a computing entity (such as the text string computing entity 105 described above in connection with FIG. 1 and FIG. 2) may calculate (e.g., generate, determine, and/or the like) the relevance context score based at least in part on the at least one text classification indicator. In some examples, the computing entity may calculate (e.g., generate, determine, and/or the like) the relevance context score through a "soft voting" mechanism on the text classification indicators generated by the CNN, the RNN, and the HAN. For example, the computing entity may assign a weight value to each of the text classification indicators generated by the CNN, the RNN, and the HAN. The computing entity may multiple the numeric value generated by each text classification indicator with its corresponding weight value, and may sum up the results of multiplication as the relevance context score.

At step/operation 711, a computing entity (such as the text string computing entity 105 described above in connection with FIG. 1 and FIG. 2) may provide the relevance context score calculated (e.g., generated or determined) at step/operation 709 to a reinforcement learning algorithm. In some examples, based at least in part on the relevance context score, the computing entity may implement the reinforcement learning algorithm to adjust the randomness indicator, example details of which are described herein.

Referring now to FIG. 8, an example method 800 illustrates example operations of calculating (e.g., generating, determining, and/or the like) a grammar context score in accordance with embodiments of the present disclosure. The method 800 may start at step/operation 802. At step/operation 802, a computing entity (such as the text string computing entity 105 described above in connection with FIG. 1 and FIG. 2) may receive an utterance set, similar to those described above in connection with step/operation 701 of FIG. 7.

At step/operation 804, a computing entity (such as the text string computing entity 105 described above in connection with FIG. 1 and FIG. 2) may generate a first token set based at least in part on the first utterance set. In some examples, the first token set may comprise one or more tokens corresponding to one or more words in the first utterance set. In the present disclosure, the term "token" may refer to an instance of a sequence of characters that are grouped together as a useful semantic unit for processing. For example, a token may correspond to a word in a sentence. As an example, the following may be an example utterance set that is substantially in the form of a sentence:

I am looking for back pain coverage

Continuing from the above example, the following may be an example token set corresponding to the above example utterance set, where each token is separated by a semicolon:

I; am; looking; for; back; pain; coverage

At step/operation 806, a computing entity (such as the text string computing entity 105 described above in connection with FIG. 1 and FIG. 2) may generate a first tag set based at least in part on the first token set. In some examples, the first tag set may comprise one or more tags corresponding to the one or more tokens in the first token set. In some examples, each of the one or more tags is associated with the one or more grammar context rules. For example, each tag may indicate syntax information associated with each token. Example syntax information may include, but is not limited to, part of speech.

In some examples, the computing entity may implement one or more natural language processing algorithms to generate the tag set. Continuing from the above example, the computing entity may implement one or more natural language processing algorithms to determine the part of speech of each token in the token set, and may generate a tag set accordingly. As an example, the following may be an example token set, where each token is separated by a semicolon:

I; am; looking; for; back; pain; coverage

Continuing from the above example, the following may be an example tag set corresponding to the above example token set:

pronoun; verb; verb; conjunction; noun; noun; noun

At step/operation 808, a computing entity (such as the text string computing entity 105 described above in connection with FIG. 1 and FIG. 2) may generate one or more word tagging rules. In the present disclosure, the term "word tagging rule" may refer to a criterion for evaluating the appropriateness of a string of text to the English language. For example, a word tagging rule may indicate an order or sequence for arranging one or more words based at least in part on their corresponding parts of speech. As an example, the following may be an example word tagging rule that indicates a particular order/sequence of parts of speed:

Pronoun→verb→verb→conjunction→noun→
   noun→noun

In some examples, the computing entity may generate a plurality of word tagging rules. For example, the computing entity may utilize natural language processing algorithms to analyze utterances in the historical utterance set, and may derive the word tagging rules based at least in part on the utterances in the historical utterance set.

In some examples, the computing entity may store word tagging rules generated at step/operation 808 in a memory element (such as the memory element 206 described above in connection with FIG. 2). While the above description may provide examples of word tagging rules, it is noted that the scope of the present disclosure is not limited to these examples only. In some examples, the wording tagging rules may be in other forms.

At step/operation 810, a computing entity (such as the text string computing entity 105 described above in connection with FIG. 1 and FIG. 2) may calculate (e.g., generate, determine, and/or the like) a matching percentage between the first tag set and the one or more grammar context rules. For example, as described above, the one or more grammar context rules may indicate an order or sequence for arranging one or more words based at least in part on their corresponding parts of speech. In such an example, the computing entity may compare the order or sequence of tags in the tag set with the order or sequence as indicated in the one or more grammar context rules, and may calculate (e.g., generate, determine, and/or the like) a matching percentage that may indicate how closely the order or sequence in the tag set follows the order or sequence of the one or more grammar context rules.

While the above description provides an example of determining the matching percentage, it is noted that the scope of the present disclosure is not limited to this example only. Additionally, or alternatively, the computing entity may calculate (e.g., generate, determine, and/or the like) the matching percentage based at least in part on other methods and/or algorithms.

In some examples, the at least one grammar context score may be determined based at least in part on the matching percentage. For example, the computing entity may set the matching percentage as the grammar context score. Additionally, or alternatively, the computing entity may calculate (e.g., generate, determine, and/or the like) two grammar context scores, one may indicate a likelihood that the utterance is grammatically correct (for example, based at least in part on the matching percentage), and the other may indicate a likelihood that the utterance not grammatically correct (for example, based at least in part on one-hundred percent (100%) minus the matching percentage)

At step/operation 812, a computing entity (such as the text string computing entity 105 described above in connection with FIG. 1 and FIG. 2) may provide the grammar context score calculated (e.g., generated or determined) at step/operation 810 to a reinforcement learning algorithm. In some examples, based at least in part on the grammar context score, the computing entity may implement the reinforcement learning algorithm to adjust the randomness indicator, example details of which are described herein.

d. Exemplary Reinforcement Learning Algorithm

As described above, in some examples, a computing entity (such as the text string computing entity 105 described above in connection with FIG. 1 and FIG. 2) may implement a reinforcement learning algorithm, which may provide feedback data from the discriminative machine learning model to the generative machine learning model for improving the grammatic concreteness and/or contextual relevance of utterances generated by the generative machine learning model. FIG. 9A and FIG. 9B illustrate example operations associated with an example reinforcement learning algorithm.

Figure 9A:
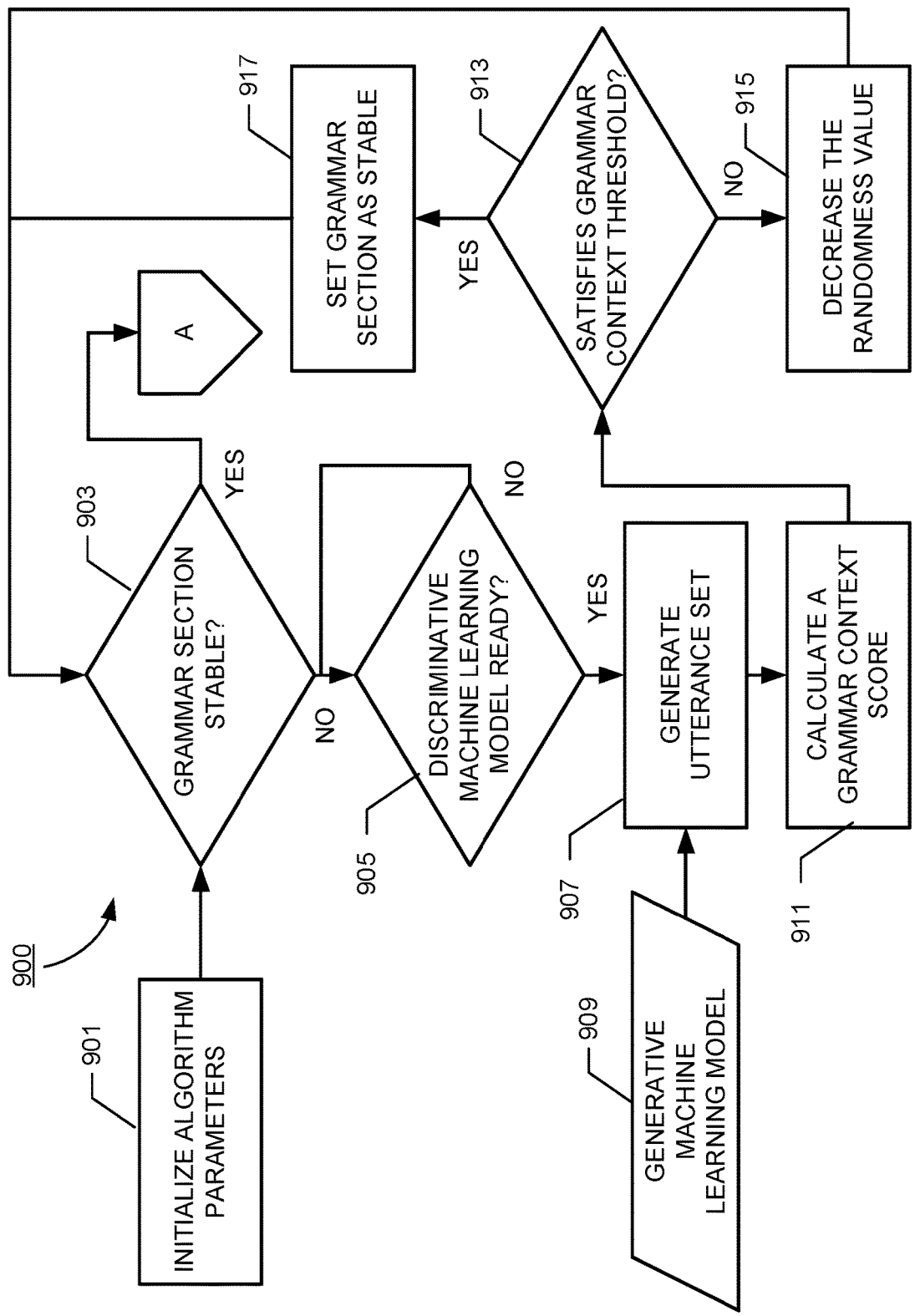

Referring now to FIG. 9A, an example method 900 illustrates example operations of an example reinforcement learning algorithm in accordance with embodiments of the present disclosure. In particular, FIG. 9A illustrates example steps/operations associated with determining whether a grammar section of the reinforcement learning algorithm is stable.

The method 900 may start at step/operation 901. At step/operation 901, a computing entity (such as the text string computing entity 105 described above in connection with FIG. 1 and FIG. 2) may set initial values for parameters associated with the generative machine learning model, the discriminative machine learning model, and/or the reinforcement learning algorithm.

For example, the computing entity may provide an initial randomness value for the generative machine learning model. As described above, the computing entity may set the initial randomness value at 0.99. In some examples, the computing entity may set the initial randomness value at other values.

Additionally, or alternatively, the computing entity may set a grammar context threshold, which may be compared to the grammar context score associated with an utterance set, details of which are further described in connection with at least step/operation 913. In some examples, the computing entity may set the initial grammar context threshold at 0.8. In some examples, the computing entity may set the initial grammar context threshold at other values.

Additionally, or alternatively, the computing entity may set a flag value that may indicate whether the grammar section is stable. In some examples, the computing entity may set the initial flag value as FALSE. Example details regarding flag value are further described in connection with at least step/operation 903.

Additionally, or alternatively, the computing entity may set other values associated with the generative machine learning model and/or the discriminative machine learning model. For example, the computing entity may set the number of utterances in an utterance set generated by the generative machine learning model.

At step/operation 903, a computing entity (such as the text string computing entity 105 described above in connection with FIG. 1 and FIG. 2) may determine whether the grammar section of the reinforcement learning algorithm is stable. As used herein, the grammar section may refer to the part of the reinforcement learning algorithm related to determining and improving the grammatical correctness associated with the utterances generated by the generative machine learning model. In some examples, the computing entity may implement the flag value (TRUE or FALSE) that may indicate whether the grammar section is stable. For example, if the flag value is TRUE, it may indicate that the grammar section is stable, and that utterances generated by the generative machine learning model are grammatically correct. If the flag value is FALSE, it may indicate that the grammar section is not stable, and that utterances generated by the generative machine learning model are not grammatically correct.

As described above, the computing entity may set the initial flag value as FALSE, which may indicate that the grammar section is not stable prior to other steps/operations as shown in FIG. 9A. As such, the method 900 may proceed to step/operation 905. At step/operation 905, a computing entity (such as the text string computing entity 105 described above in connection with FIG. 1 and FIG. 2) may determine whether the discriminative machine learning model is ready. For example, as described above in connection with at least FIG. 6, the computing entity may generate a training dataset for training the discriminative machine learning model. When the training is completed, the computing entity may generate a ready signal to the reinforcement learning algorithm, and the method 900 may proceed to step/operation 907. If the training is not completed and/or the reinforcement learning algorithm does not receive a ready signal, the computing entity may determine that the discriminative machine learning model is not ready. In this situation, the computing entity may wait until the discriminative machine learning model has been completely trained before continuing to other steps/operations of the method 900.

At step/operation 907, a computing entity (such as the text string computing entity 105 described above in connection with FIG. 1 and FIG. 2) may generate an utterance set. For example, the computing entity may generate the utterance set based at least in part on an input string and a randomness indicator via the generative machine learning model 909, similar to those described above in connection with at least FIG. 5.

At step/operation 911, a computing entity (such as the text string computing entity 105 described above in connection with FIG. 1 and FIG. 2) may calculate (e.g., generate, determine, and/or the like) a grammar context score associated with the utterance set generated at step/operation 907. For example, the computing entity may calculate (e.g., generate, determine, and/or the like) at least one grammar context score for the utterance set based at least in part on one or more grammar context rules, similar to those described above in connection with at least FIG. 8.

At step/operation 913, a computing entity (such as the text string computing entity 105 described above in connection with FIG. 1 and FIG. 2) may determine whether the grammar context score satisfies the grammar context threshold. In some examples, the computing entity may calculate (e.g., generate, determine, and/or the like) a total grammar context score associated with all utterances in the utterance set at step/operation 911. In such examples, the computing entity may calculate (e.g., generate, determine, and/or the like) an average grammar context score based at least in part on dividing the total grammar context score by the number of utterances in the utterance set, and may determine whether the average grammar context score satisfies the grammar context threshold. In some examples, the computing entity may determine that the grammar context score satisfies the grammar context threshold if the grammar context score is equal to or is more than (e.g., satisfies) the grammar context threshold. In some examples, the computing entity may determine that the grammar context score does not satisfy the grammar context threshold if the grammar context score is less than the grammar context threshold.

If, at step/operation 913, the computing entity determines that the grammar context score does not satisfy the grammar context threshold, the method 900 may decrease a randomness value associated with the randomness indicator at step/operation 915. For example, the computing entity may decrease the randomness value by 0.01. Additionally, or alternatively, the computing entity may decrease the randomness value by other values. Subsequently, the method 900 may proceed to step/operation 903, where the computing entity may determine whether the grammar section is stable. Based at least in part on the determining that the grammar section is not stable (for example, the flag value equals to FALSE), the method 900 may proceed to step/operation 905 and step/operation 907. For example, the computing entity may generate another utterance set at step/operation 907 based at least in part on the randomness value that has been decreased at step/operation 915.

As such, one or more example feedback loops may be generated. For example, as illustrated in FIG. 9A, the computing entity may (a) generate an utterance set based at least in part on the input string and the randomness indicator (step/operation 907); (b) calculate (e.g., generate, determine, and/or the like) a grammar context score for the utterance set based at least in part on the one or more grammar context rules (step/operation 911); (c) determine whether the grammar context score satisfies the grammar context threshold (step/operation 913); (d) in response to determining that the grammar context score does not satisfy the grammar context threshold, adjust the randomness indicator (step/operation 915); and (e) repeat step (a) to step (d) until the grammar context score satisfies the grammar context threshold (step/operation 903). In some examples, other feedback loops may be derived from FIG. 9A.

If, at step/operation 913, the computing entity determines that the grammar context score satisfies the grammar context threshold, the method 900 may determine that the grammar section is stable at step/operation 917 (and may set the flag value as TRUE), and the method 900 may proceed to step/operation 903. At step/operation 903, the computing entity may determine that the grammar section is stable (as the computing entity has set the flag value as TRUE at step/operation 917), and the method 900 may proceed to these steps/operations as illustrated in FIG. 9B.

Figure 9B:
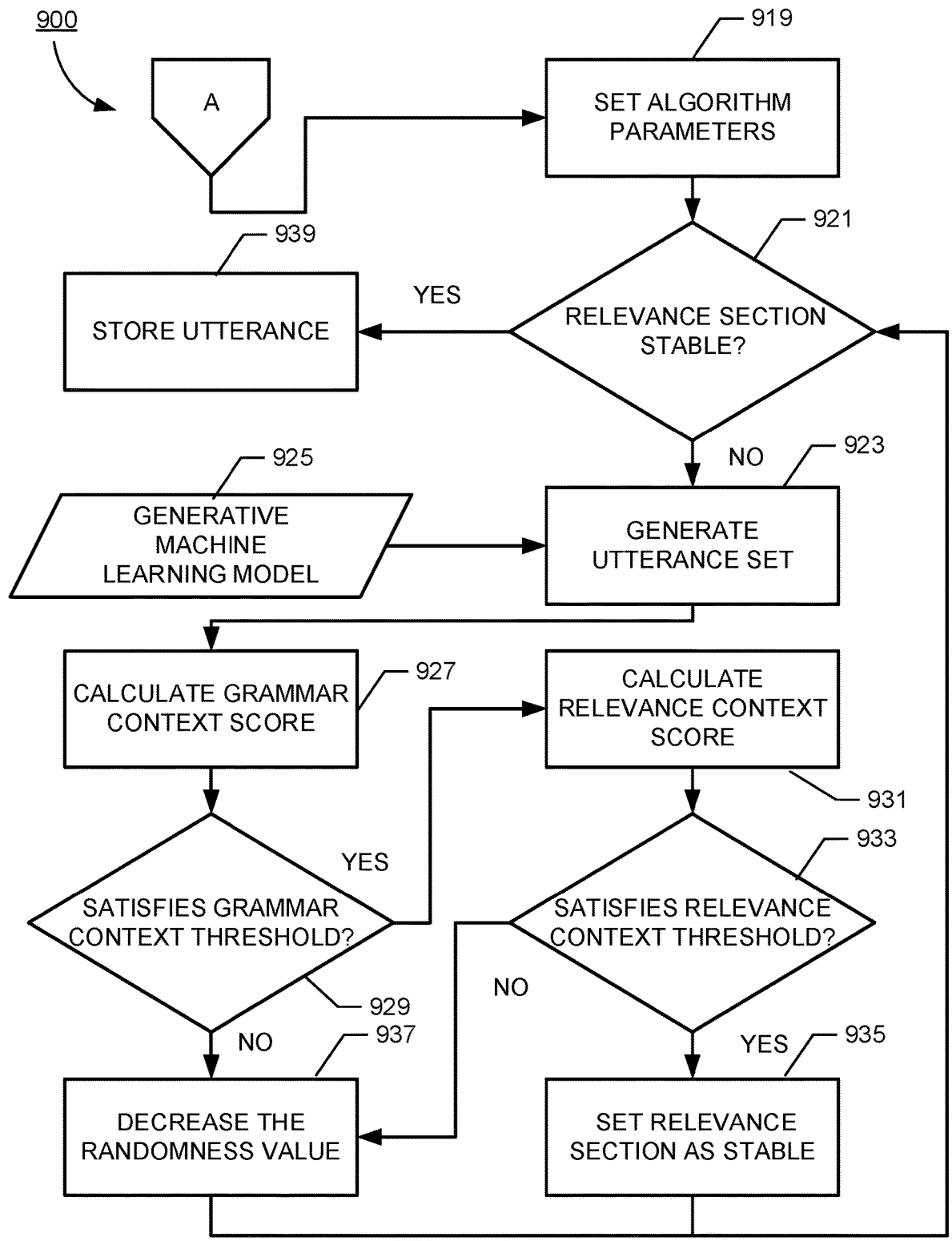

Referring now to FIG. 9B, additional steps/operations associated with the example method 900 are illustrated. In particular, FIG. 9B illustrates example steps/operations associated with determining whether both the relevance section and the grammar section of the reinforcement learning algorithm are stable.

At step/operation 919, a computing entity (such as the text string computing entity 105 described above in connection with FIG. 1 and FIG. 2) may set values of some parameters associated with the generative machine learning model, the discriminative machine learning model, and/or the reinforcement learning algorithm. In some examples, the computing entity may further adjust the randomness value at step/operation 919. For example, the computing entity may decrease the randomness value (as already adjusted by the computing entity based at least in part on steps/operations illustrated in FIG. 9A) by a predetermined randomness buffer value (for example, 0.02). In some examples, by adjusting the randomness value at step/operation 919, the computing entity may improve the grammatic correctness of utterances generated by the generative machine learning model.

Additionally, or alternatively, the computing entity may set a relevance context threshold, which may be compared to the relevance context score associated with an utterance set, details of which are further described in connection with at least step/operation 933. In some examples, the computing entity may set the initial relevance context threshold at 0.8. In some examples, the computing entity may set the initial relevance context threshold at other values.

Additionally, or alternatively, the computing entity may set a flag value that may indicate whether the relevance section is stable. In some examples, the computing entity may set the initial flag value as FALSE. Example details regarding flag value are further described in connection with at least step/operation 921. At step/operation 921, a computing entity (such as the text string computing entity 105 described above in connection with FIG. 1 and FIG. 2) may determine whether a relevance section of the reinforcement learning algorithm is stable.

As used herein, the relevance section may refer to the part of the reinforcement learning algorithm related to determining and improving the contextual relevance associated with the utterances generated by the generative machine learning model. In some examples, the computing entity may implement a flag value (TRUE or FALSE) that may indicate whether the relevance section is stable. For example, if the flag value is TRUE, it may indicate that the relevance section is stable, and that utterances generated by the generative machine learning model are contextually relevant. If the flag value is FALSE, it may indicate that the relevance section is not stable, and that utterances generated by the generative machine learning model are not contextually relevant.

As described above, the computing entity may set the initial flag value as FALSE, which may indicate that the relevance section is not stable prior to other steps/operations as shown in FIG. 9B. As such, the method 900 may proceed to step/operation 923. At step/operation 923, a computing entity (such as the text string computing entity 105 described above in connection with FIG. 1 and FIG. 2) may generate an utterance set. For example, the computing entity may generate the utterance set based at least in part on an input string and a randomness indicator via the generative machine learning model 925, similar to those described above in connection with at least FIG. 5.

At step/operation 927, a computing entity (such as the text string computing entity 105 described above in connection with FIG. 1 and FIG. 2) may calculate (e.g., generate, determine, and/or the like) a grammar context score associated with the utterance set generated at step/operation 923, similar to those described above in connection with step/operation 911.

At step/operation 929, a computing entity (such as the text string computing entity 105 described above in connection with FIG. 1 and FIG. 2) may determine whether the grammar context score satisfies the grammar context threshold. In some examples, the computing entity may calculate (e.g., generate, determine, and/or the like) a total grammar context score associated with all utterances in the utterance set at step/operation 927. In such examples, the computing entity may calculate (e.g., generate, determine, and/or the like) an average grammar context score based at least in part on dividing the total grammar context score by the number of utterances in the utterance set, and may determine whether the average grammar context score satisfies the grammar context threshold.

In some examples, the computing entity may determine that the grammar context score satisfies the grammar context threshold if the grammar context score is equal to or is more than (e.g., satisfies) the grammar context threshold. In some examples, the computing entity may determine that the grammar context score does not satisfy the grammar context threshold if the grammar context score is less than the grammar context threshold.

If, at step/operation 929, the computing entity determines that the grammar context score does not satisfy the grammar context threshold, the method 900 may decrease a randomness value associated with the randomness indicator at step/operation 937, similar to those described above in connection with step/operation 915.

If, at step/operation 929, the computing entity determines that the grammar context score satisfies the grammar context threshold, the method 900 may proceed to step/operation 931. At step/operation 931, the computing entity may calculate (e.g., generate, determine, and/or the like) a relevance context score associated with the utterance set generated at step/operation 923. For example, the computing entity may calculate (e.g., generate, determine, and/or the like) at least one relevance context score for the first utterance set via a discriminative machine learning model, similar to those described above in connection with at least FIG. 6 and FIG. 7.

At step/operation 933, a computing entity (such as the text string computing entity 105 described above in connection with FIG. 1 and FIG. 2) may determine whether the relevance context score satisfies the relevance context threshold. In some examples, the computing entity may calculate (e.g., generate, determine, and/or the like) a total relevance context score associated with all utterances in the utterance set at step/operation 931. In such examples, the computing entity may calculate (e.g., generate, determine, and/or the like) an average relevance context score based at least in part on dividing the total relevance context score by the number of utterances in the utterance set, and may determine whether the average relevance context score satisfies the relevance context threshold. In some examples, the computing entity may determine that the relevance context score satisfies the relevance context threshold if the relevance context score is equal to or is more than (e.g., satisfies) the relevance context threshold. In some examples, the computing entity may determine that the relevance context score does not satisfy the relevance context threshold if the relevance context score is less than the relevance context threshold.

If, at step/operation 933, the computing entity determines that the grammar context score does not satisfy the relevance context threshold, the method 900 may decrease a randomness value associated with the randomness indicator at step/operation 937. For example, the computing entity may decrease the randomness value by 0.01. Additionally, or alternatively, the computing entity may decrease the randomness value by other values. Subsequently, the method 900 may proceed to step/operation 921, where the computing entity may determine whether the relevance section is stable. Based at least in part on the determining that the relevance section is not stable (for example, the flag value equals to FALSE), the method 900 may proceed to step/operation 923. For example, the computing entity may generate another utterance set at step/operation 923 based at least in part on the randomness value that has been decreased at step/operation 937.

As such, one or more example feedback loops may be generated. For example, as illustrated in FIG. 9B, the computing entity may (f) adjust the randomness indicator by a randomness buffer value (step/operation 919); (g) calculate (e.g., generate, determine, and/or the like) a relevance context score for the first utterance set via the discriminative machine learning model (step/operation 931); (h) determine whether the relevance context score satisfies the relevance context threshold (step/operation 933); (i) in response to determining that the relevance context score does not satisfy the relevance context threshold, adjust the randomness indicator (step/operation 937); and ( ) repeat step (g) to step (i) until the relevance context score satisfies the relevance context threshold (step/operation 921). In some examples, other feedback loops may be derived from FIG. 9B.

If, at step/operation 933, the computing entity determines that the relevance context score satisfies the relevance context threshold, the method 900 may determine that the relevance section is stable at step/operation 935 (and may set the flag value as TRUE), and the method 900 may proceed to step/operation 921. At step/operation 921, the computing entity may determine that the relevance section is stable (as the computing entity has set the flag value as TRUE at step/operation 935), and the method 900 may proceed to step/operation 939.

While FIG. 9B illustrates determining whether the relevance section is stable based at least in part on whether the relevance context score satisfies the relevance context threshold, it is noted that the scope of the present disclosure is not limited to this example only. Additionally, or alternatively, examples of the present disclosure may implement other criteria for determining whether the relevance section is stable. For example, the computing entity may determine whether the randomness indicator satisfies a threshold value (for example, 0.01). Based at least in part on determining that the randomness indicator satisfies the threshold value (for example, the randomness indicator is less than 0.01), the computing entity may determine that the relevance section is stable, in addition to or in alternative of determining whether relevance context score satisfies the relevance context threshold.

At step/operation 939, a computing entity (such as the text string computing entity 105 described above in connection with FIG. 1 and FIG. 2) may store the generated utterances, similar to step/operation 412 described above in connection with FIG. 4.

As illustrated above, examples of the present disclosure may adjust the randomness indicator based at least in part on the feedback data provided by the discriminative machine learning model, such that the generative machine learning model may generate more grammatically correct and contextually relevant utterances based at least in part on the adjusted randomness indicator. For example, the example steps/operations of FIG. 9A illustrate adjusting the randomness indicator based at least in part on the feedback data associated with the grammatical correctness (for example, the grammar context score). The example steps/operations of FIG. 9B illustrate adjusting the randomness indicator based at least in part on the feedback data associated with the contextual relevance (for example, the relevance context score) as well as the grammatical correctness (for example, the grammar context score).

As described above, utterances generated in accordance with examples of the present disclosure may be, for example, provided to a chatbot as a training dataset. By implementing the generative machine learning model, the discriminative machine learning model, and the reinforcement learning algorithm, examples of the present disclosure may improve the contextual relevance and the grammatic correctness of the generated utterances. As a result, the chatbot may be trained with utterances that are contextually relevant and the grammatically correct, and, after the training is completed, the chatbot may provide complete, precise and unambiguous answers to questions from human users. In some examples, examples of the present disclosure may be implemented in other contexts.

V. CONCLUSION

Many modifications and other embodiments of the disclosure set forth herein will come to mind to one skilled in the art to which this disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for programmatically generating utterances, the apparatus comprising at least one processor and at least one non-transitory memory comprising a computer program code, wherein the at least one non-transitory memory and the computer program code are configured to, with the at least one processor, cause the apparatus to:
   receive an input string;
   generate a first utterance set based at least in part on inputting the input string and a randomness indicator to a generative machine learning model, wherein the first utterance set comprises one or more utterances;
   generate at least one grammar context score for the first utterance set based at least in part on one or more grammar context rules, wherein the at least one grammar context score indicates at least one grammatical correctness likelihood associated with at least one of the one or more utterances in the first utterance set;
   generate at least one relevance context score for the first utterance set based at least in part on inputting the first utterance set to a discriminative machine learning model;
   adjust the randomness indicator based at least in part on one or more of the at least one grammar context score, a grammar context threshold, the at least one relevance context score, and a relevance context threshold; and
   generate a second utterance set based at least in part on the input string and the adjusted randomness indicator.

2. The apparatus of claim 1, wherein, when generating the first utterance set, the at least one non-transitory memory and the computer program code are configured to, with the at least one processor, cause the apparatus to further:
   retrieve a historical utterance set from an utterance database; and
   generate the generative machine learning model based at least in part on the historical utterance set.

3. The apparatus of claim 1, wherein, when generating the at least one grammar context score, the at least one non-transitory memory and the computer program code are configured to, with the at least one processor, cause the apparatus to further:
   generate a first token set based at least in part on the first utterance set, wherein the first token set comprises one or more tokens corresponding to one or more words in the first utterance set;
   generate a first tag set based at least in part on the first token set, wherein the first tag set comprises one or more tags corresponding to the one or more tokens in the first token set, wherein each of the one or more tags is associated with the one or more grammar context rules; and
   determine a matching percentage between the first tag set and the one or more grammar context rules, wherein the at least one grammar context score is associated with the matching percentage.

4. The apparatus of claim 1, wherein, when generating the at least one relevance context score, the at least one non-transitory memory and the computer program code are configured to, with the at least one processor, cause the apparatus to further:
   generate a training dataset based at least in part on the input string; and
   generate the discriminative machine learning model based at least in part on the training dataset, wherein the discriminative machine learning model comprises at least one text classification model.

5. The apparatus of claim 4, wherein the at least one text classification model comprises a Recurrent Neural Network (RNN), a Convolutional Neural Network (CNN), and a Hierarchical Attention Network (HAN).

6. The apparatus of claim 4, wherein the at least one non-transitory memory and the computer program code are configured to, with the at least one processor, cause the apparatus to further:
   generate at least one text classification indicator based at least in part on the first utterance set and the at least one text classification model; and
   generate the at least one relevance context score based at least in part on the at least one text classification indicator.

7. The apparatus of claim 1, wherein, when adjusting the randomness indicator, the at least one non-transitory memory and the computer program code are configured to, with the at least one processor, cause the apparatus to further:
   determine whether the at least one grammar context score satisfies the grammar context threshold; and
   in response to determining that the at least one grammar context score does not satisfy the grammar context threshold, decrease a randomness value associated with the randomness indicator.

8. The apparatus of claim 1, wherein, when adjusting the randomness indicator, the at least one non-transitory memory and the computer program code are configured to, with the at least one processor, cause the apparatus to further:

determine whether the at least one relevance context score satisfies the relevance context threshold; and in response to determining that the at least one relevance context score does not satisfy the relevance context threshold, decrease a randomness value associated with the randomness indicator.

9. The apparatus of claim 1, wherein the at least one non-transitory memory and the computer program code are configured to, with the at least one processor, cause the apparatus to further:

(a) generate an utterance set based at least in part on the input string and the randomness indicator;

(b) generate a grammar context score for the utterance set based at least in part on the one or more grammar context rules;

(c) determine whether the grammar context score satisfies the grammar context threshold;

(d) in response to determining that the grammar context score does not satisfy the grammar context threshold, adjust the randomness indicator; and (e) repeat step (a) to step (d) until the grammar context score satisfies the grammar context threshold.

10. The apparatus of claim 9, wherein the at least one non-transitory memory and the computer program code are configured to, with the at least one processor, cause the apparatus to further:

(f) subsequent to step (e), adjust the randomness indicator by a randomness buffer value;

(g) generate a relevance context score for the first utterance set via the discriminative machine learning model;

(h) determine whether the relevance context score satisfies the relevance context threshold;

(i) in response to determining that the relevance context score does not satisfy the relevance context threshold, adjust the randomness indicator; and (j) repeat step (g) to step (i) until the relevance context score satisfies the relevance context threshold.

11. A computer-implemented method for programmatically generating utterances, comprising:

receiving an input string;

generating a first utterance set based at least in part on inputting the input string and a randomness indicator to a generative machine learning model, wherein the first utterance set comprises one or more utterances;

generating at least one grammar context score for the first utterance set based at least in part on one or more grammar context rules, wherein the at least one grammar context score indicates at least one grammatical correctness likelihood associated with at least one of the one or more utterances in the first utterance set;

generating at least one relevance context score for the first utterance set based at least in part on inputting the first utterance set to a discriminative machine learning model;

adjusting the randomness indicator based at least in part on one or more of the at least one grammar context score, a grammar context threshold, the at least one relevance context score, and a relevance context threshold; and generating a second utterance set based at least in part on the input string and the adjusted randomness indicator.

12. The computer-implemented method of claim 11, wherein generating the first utterance set further comprises:

retrieving a historical utterance set from an utterance database; and generating the generative machine learning model based at least in part on the historical utterance set.

13. The computer-implemented method of claim 11, wherein generating the at least one grammar context score further comprises:

generating a first token set based at least in part on the first utterance set, wherein the first token set comprises one or more tokens corresponding to one or more words in the first utterance set;

generating a first tag set based at least in part on the first token set, wherein the first tag set comprises one or more tags corresponding to the one or more tokens in the first token set, wherein each of the one or more tags is associated with the one or more grammar context rules; and determining a matching percentage between the first tag set and the one or more grammar context rules, wherein the at least one grammar context score is associated with the matching percentage.

14. The computer-implemented method of claim 11, wherein generating the at least one relevance context score further comprises:

generating a training dataset based at least in part on the input string; and generating the discriminative machine learning model based at least in part on the training dataset, wherein the discriminative machine learning model comprises at least one text classification model.

15. The computer-implemented method of claim 14, wherein the at least one text classification model comprises a Recurrent Neural Network (RNN), a Convolutional Neural Network (CNN), and a Hierarchical Attention Network (HAN).

16. The computer-implemented method of claim 14, further comprising:

generating at least one text classification indicator based at least in part on the first utterance set and the at least one text classification model; and generating the at least one relevance context score based at least in part on the at least one text classification indicator.

17. The computer-implemented method of claim 11, wherein adjusting the randomness indicator further comprises:

determining whether the at least one grammar context score satisfies the grammar context threshold; and in response to determining that the at least one grammar context score does not satisfy the grammar context threshold, decreasing a randomness value associated with the randomness indicator.

18. The computer-implemented method of claim 11, wherein adjusting the randomness indicator further comprises:

determining whether the at least one relevance context score satisfies the relevance context threshold; and in response to determining that the at least one relevance context score does not satisfy the relevance context threshold, decreasing a randomness value associated with the randomness indicator.

19. A computer program product for programmatically generating utterances, the computer program product comprising at least one non-transitory computer-readable storage medium having computer-readable program code portions stored therein, the computer-readable program code portions comprising an executable portion configured to:

receive an input string;

generate a first utterance set based at least in part on inputting the input string and a randomness indicator to a generative machine learning model, wherein the first utterance set comprises one or more utterances;

generate at least one grammar context score for the first utterance set based at least in part on one or more grammar context rules, wherein the at least one grammar context score indicates at least one grammatical correctness likelihood associated with at least one of the one or more utterances in the first utterance set;

generate at least one relevance context score for the first utterance set based at least in part on inputting the first utterance set to a discriminative machine learning model;

adjust the randomness indicator based at least in part on one or more of the at least one grammar context score, a grammar context threshold, the at least one relevance context score, and a relevance context threshold; and generate a second utterance set based at least in part on the input string and the adjusted randomness indicator.

20. The apparatus of claim 1, wherein the at least one non-transitory memory and the computer program code are configured to, with the at least one processor, cause the apparatus to:

prior to generating the first utterance set, set the randomness indicator according to an initial value.

* * * * *

UNITED STATES PATENT AND TRADEMARK OFFICE
CERTIFICATE OF CORRECTION

PATENT NO. : 11,494,562 B2
APPLICATION NO. : 15/929645
DATED : November 8, 2022
INVENTOR(S) : Rahul Dutta et al.

It is certified that error appears in the above-identified patent and that said Letters Patent is hereby corrected as shown below:

In the Claims

In Column 29, Line 63, Claim 1, before "the at least one" delete "one or more of".

In Column 31, Line 60, Claim 11, before "the at least one" delete "one or more of".

In Column 33, Line 17, Claim 19, before "the at least one" delete "one or more of".

Signed and Sealed this
Twenty-first Day of February, 2023

Katherine Kelly Vidal
*Director of the United States Patent and Trademark Office*